(12) United States Patent
Fields et al.

(10) Patent No.: US 8,877,117 B2
(45) Date of Patent: Nov. 4, 2014

(54) INJECTION BLOW MOLDING SYSTEM WITH ENHANCED PARISON TEMPERATURE CONTROL

(75) Inventors: Randal L. Fields, Greenwood, MO (US); Bruce A. Wardlow, Lee's Summit, MO (US); David A. Brunson, Lee's Summit, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 499 days.

(21) Appl. No.: 12/951,882

(22) Filed: Nov. 22, 2010

(65) Prior Publication Data

US 2012/0126462 A1 May 24, 2012

(51) Int. Cl.
*B29C 49/06* (2006.01)

(52) U.S. Cl.
CPC ................... *B29C 49/063* (2013.01)
USPC ............ 264/537; 264/519; 264/538; 425/526

(58) Field of Classification Search
None
See application file for complete search history.

(56) References Cited

U.S. PATENT DOCUMENTS

| | | | |
|---|---|---|---|
| 2,331,687 A | 10/1943 | Hobson | |
| 2,353,825 A | 7/1944 | Hofmann | |
| 2,853,736 A | 9/1958 | Gussoni | |
| 3,137,748 A | 6/1964 | Makowski | |
| 3,480,993 A | 12/1969 | Schjeldahl et al. | |
| 3,776,991 A | 12/1973 | Marcus | |
| 3,941,539 A | 3/1976 | Saumsiegle et al. | |
| 3,947,176 A | 3/1976 | Rainville | |
| 3,988,100 A | 10/1976 | Julien | |
| 4,018,860 A | 4/1977 | Farrell | |
| 4,063,867 A | 12/1977 | Janniere | |
| 4,131,410 A | 12/1978 | Aoki | |
| 4,174,934 A * | 11/1979 | Valyi | 425/112 |
| 4,201,535 A | 5/1980 | Ninneman | |
| 4,435,147 A | 3/1984 | Myers et al. | |
| 4,828,479 A * | 5/1989 | Pleasant | 425/192 R |
| 4,941,815 A | 7/1990 | Julian | |
| 5,062,784 A | 11/1991 | Inaba et al. | |
| 5,470,218 A | 11/1995 | Hillman et al. | |
| 5,599,567 A | 2/1997 | Gellert | |
| 5,900,259 A | 5/1999 | Miyoshi et al. | |
| RE38,396 E | 1/2004 | Gellert | |
| 7,381,045 B2 | 6/2008 | Fields et al. | |
| 7,431,870 B2 | 10/2008 | Speight | |

FOREIGN PATENT DOCUMENTS

WO WO 2007/021275 2/2007

OTHER PUBLICATIONS

Samuel L. Belcher, Practical Guide to Injection Blow Molding, Plastics Engineering Series, CRC Press Taylor & Francis Group, 2007, pp. 1-182, Boca Raton, Florida.

U.S. Appl. No. 12/951,901, filed Nov. 22, 2010; Title: Injection Blow Molding System With Enhanced Heat Transfer Channel Configuration; Inventors: Randal L. Fields et al.

(Continued)

*Primary Examiner* — Monica Huson
(74) *Attorney, Agent, or Firm* — Hovey Williams LLP

(57) ABSTRACT

An injection blow molding (IBM) system and method for consistently maintaining the surface temperature of the parison molds within a desired range. Implementation of this system/method can result in more consistent production of higher quality parisons and molded articles. Additionally, this system/method reduces the discretion required by the IBM operator and shifts the burden of consistently making high-quality parisons and molded articles onto the designer of the IBM tooling.

26 Claims, 22 Drawing Sheets

(56) References Cited

OTHER PUBLICATIONS

U.S. Appl. No. 12/951,910, filed Nov. 22, 2010; Title: Injection Blow Molding System With Enhanced Parison Body Mold Configuration; Inventors: Randal L. Fields et al.

U.S. Appl. No. 12/951,920, filed Nov. 22, 2010; Title: Injection Blow Molding System With Enhanced Parison Neck Mold Configuration; Inventors: Randal L. Fields et al.

U.S. Appl. No. 12/951,934, filed Nov. 22, 2010; Title: Injection Blow Molding System With Enhanced Supply of Heat Transfer Fluid to Parison Molds; Inventors: Randal L. Fields et al.

Office Action dated Jan. 29, 2013 for co-pending U.S. Appl. No. 12/951,901; 12 pages.

Office Action dated Jan. 31, 2013 for co-pending U.S. Appl. No. 12/951,910; 10 pages.

Office Action dated Feb. 27, 2013 for co-pending U.S. Appl. No. 12/951,920; 13 pages.

Office Action dated Mar. 1, 2013 for co-pending U.S. Appl. No. 12/951,934; 11 pages.

Notice of Allowance dated May 9, 2013 for co-pending U.S. Appl. No. 12/951,910; 8 pages.

* cited by examiner

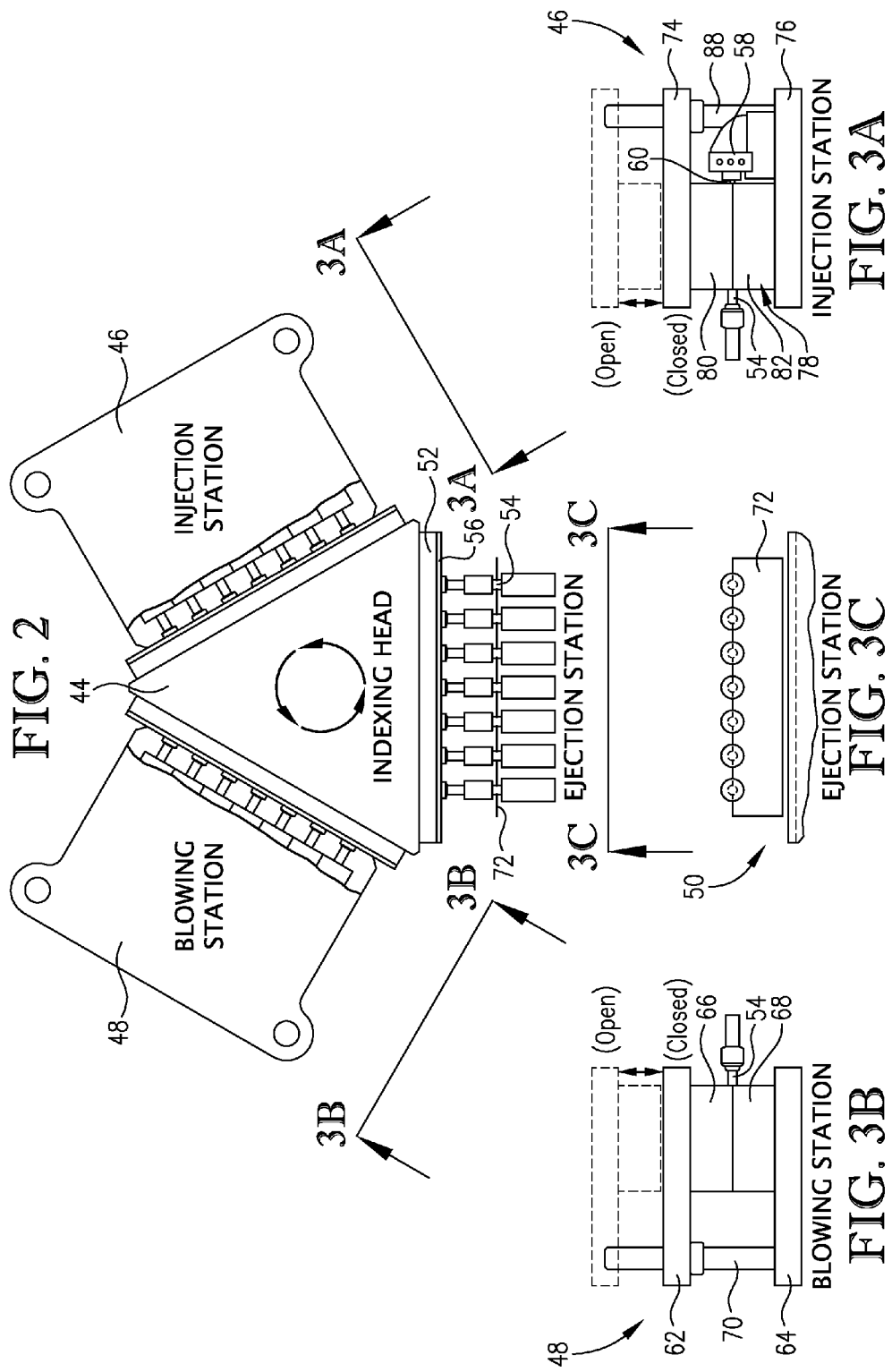

FIG. 9

INJECTION BLOW MOLDING SYSTEM WITH ENHANCED PARISON TEMPERATURE CONTROL

BACKGROUND OF THE INVENTION

1. Field of the Invention

Embodiments of the present invention relate to an injection blow molding apparatus and method for forming molded articles.

2. Description of the Related Art

Injection blow molding (IBM) is a technique used for creating various containers such as plastic bottles for medication or other contents. The IBM process is performed with an IBM machine that first injection molds a resin into a plurality of parisons of desired shapes and then blow molds the parisons into the final molded articles.

An injection station of the IBM machine typically includes a split parison mold assembly that defines a plurality of cavities within which the parisons are formed. In the injection molding stage of the IBM process, the parison-forming surfaces of the split parison mold are heated to and/or cooled to different temperatures via a plurality of water lines formed in the split parison mold near the parison-forming surfaces. The water lines may be supplied with water at different temperatures depending on the location of the water line relative to the neck or body of the parison being formed. Typically, a plurality of individual thermolators are required to control the temperature of water supplied to the various water lines in the parison mold and an operator is required to use a significant amount of discretion in making adjustments to the water temperature flowing through water lines at different locations along the body and/or neck of the parison during the injection blow molding process.

The operator discretion necessary to make certain parison mold designs function properly requires highly experienced IBM operators and can require significant trial and error in order to determine satisfactory operating parameters. Further, the complexity of manufacturing and operating split parison molds with multiple water lines formed therein can result in high capital costs, high operating costs, and high maintenance costs.

Thus, it would be desirable to have an injection molding system and/or process where IBM operator discretion is minimized, trial-and-error operation of the IBM operator is minimized, and mold tooling design, fabrication, replacement, and maintenance costs are minimized.

SUMMARY OF THE INVENTION

Some embodiments of the present invention disclose an injection blow molding process. The injection blow molding process includes a step of injection molding a polyolefin resin at an injection station to form a plurality of parisons. The injection station includes a split parison mold assembly shiftable between an open position and a closed position. The split parison mold assembly presents first and second parison cavity surfaces that, when the split parison mold assembly is in the closed position, cooperatively define a plurality of parison cavities within which the resin is received. The injection blow molding process further includes a step of, simultaneously with the injection molding step, passing a heat transfer fluid through a plurality of heat transfer channels defined within the injection station so as to regulate the temperature of at least a portion of the parison cavity surfaces. Each of the parison cavity surfaces includes a neck-forming surface for defining the exterior shape of the necks of the parisons and a body-forming surface for defining the exterior shape of the bodies of the parisons. During the injection molding step, the surface temperature of at least 70 percent of the total surface area of the body-forming surfaces is maintained within 20° F. of a target body surface temperature. The injection blow molding process also includes the step of transferring the parisons from the injection station to a blowing station and the step of blow molding the parisons at the blowing station to form a plurality of molded articles.

Other various embodiments of the invention disclose an injection blow molding process that includes a step of injection molding a polyolefin resin into a plurality of parisons at an injection station. The injection molding step includes the substeps of (i) introducing the polyolefin resin into a plurality of parison cavities defined within the injection station and (ii) introducing a heat transfer fluid into a plurality of heat transfer channels defined within the injection station. At least 75 volume percent of the heat transfer fluid introduced into the heat transfer channels is introduced at an inlet temperature that is within 20° F. of a target inlet temperature. The injection blow molding process further includes a step of transferring the parisons from the injection station to a blowing station and a step of blow molding the parisons into molded articles at the blowing station.

Some embodiments of the invention disclose an injection blow molding system for injection molding a resin into a plurality of parisons and blow molding the parisons into a plurality of molded articles. The injection blow molding system includes an injection station defining a plurality of parison cavities for receiving the resin and a plurality of heat transfer channels for receive a heat transfer fluid. The injection blow molding system also includes a resin feeding system coupled in fluid-flow communication with the parison cavities and operable to inject the resin into the parison cavities. The injection blow molding system further includes a temperature control unit coupled in fluid-flow communication with the heat transfer channels and operable to control the temperature of the heat transfer fluid within a predetermined temperature range. In some embodiments of the injection blow molding system, only one of the temperature control units is associated with the injection station.

Other embodiments of the invention disclose an injection blow molding process that includes a step of injection molding a resin into a first group of parisons at an injection station utilizing a first split parison mold assembly to define the exterior shape of the first group of parisons. The injection blow molding process further includes a step of blow molding the first group of parisons into a first group of molded articles at a molding station. Next, the injection blow molding process includes replacing at least one component of the first split parison mold assembly to thereby provide a second split parison mold assembly. Then the injection blow molding process includes a step of injection molding the resin into a second group of parisons at the injection station utilizing the second parison mold assembly to define the exterior shape of the second group of parisons. The injection blow molding process further includes a step of blow molding the second group of parisons into a second group of blow molded articles at the blow molding station, where the first and second groups of parisons have different exterior shapes. The injection molding steps each includes passing a heat transfer fluid through a plurality of heat transfer channels defined within the injection station. The temperature of the heat transfer fluid introduced into the injection station is substantially the same during the injection molding step using the first split parison mold assembly and the injection molding step using the second split parison mold assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE FIGURES

Embodiments of the present invention are described in detail below with reference to the attached drawing figures, wherein:

FIG. 2 is a plan view of an injection blow molding apparatus, particularly illustrating the apparatus's injection station, blowing station, ejection station, and indexing head;

FIG. 3A is a side view of the injection station depicted in FIG. 1, particularly illustrating the injection mold die sets, split injection mold assembly, and resin manifold assembly;

FIG. 3B is a side view of the blowing station depicted in FIG. 1, particularly illustrating the blow mold die sets and split blow mold assembly;

FIG. 3C is a schematic side view of the ejection station depicted in FIG. 1, particularly illustrating the stripper plate used to remove blow molded articles from the core rods of the indexing head;

FIG. 9 is a cutaway front view of the injection station depicted in FIG. 5, particularly illustrating the configuration of the heat transfer channels in the neck molds;

Figure 1:
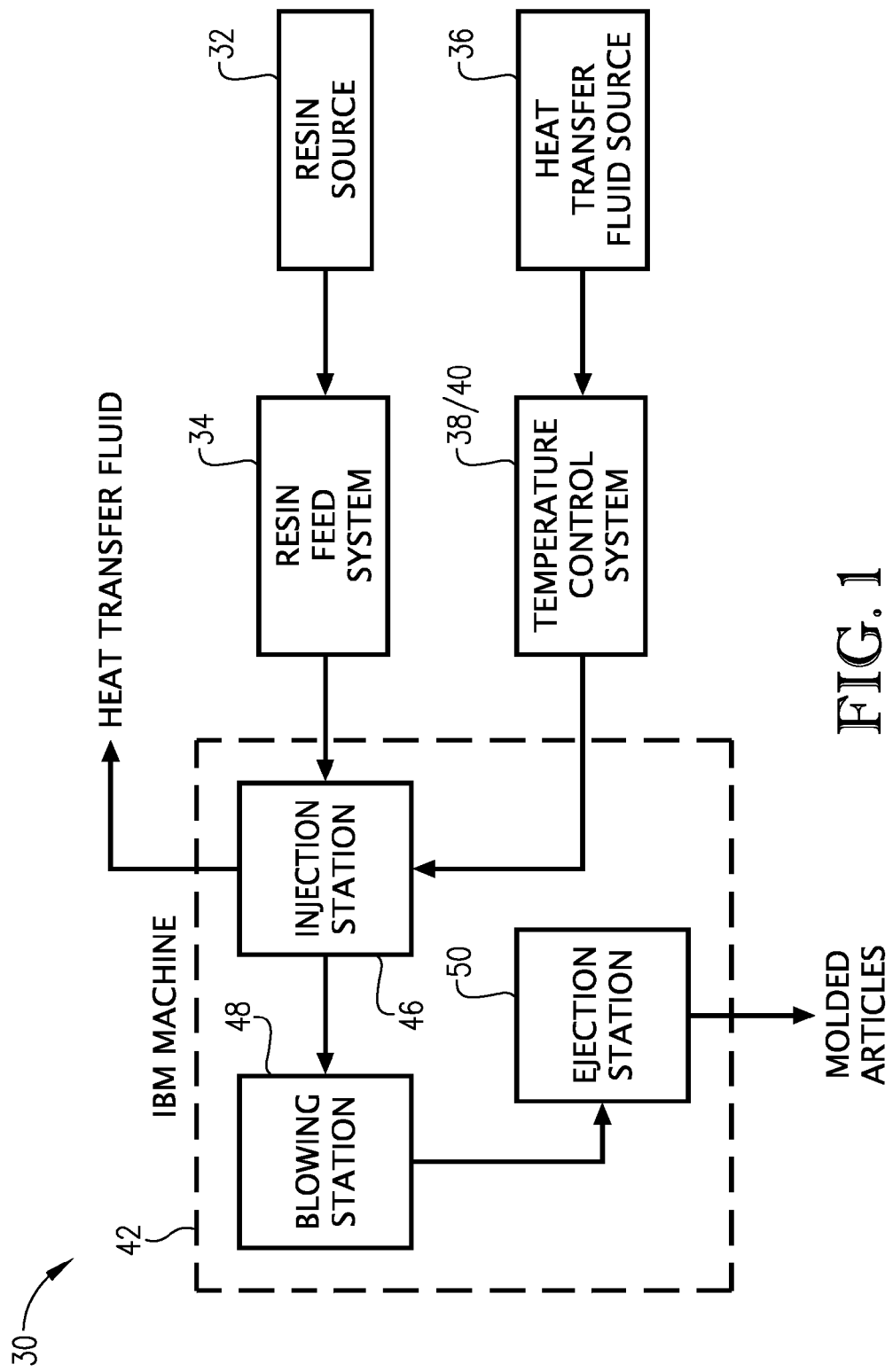
FIG. 1 is a block diagram of a system for producing blow molded articles, particularly illustrating an injection blow molding apparatus and systems for supplying resin and heat transfer fluid to an injection station of the injection blow molding apparatus.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An injection blow molding system 30, as illustrated in FIGS. 1-23, is configured for injection molding a resin into a plurality of parisons and blow molding the parisons into a plurality of molded articles. As illustrated in FIG. 1, the injection blow molding system 30 may comprise: a resin source 32, a resin feed system 34, a heat transfer fluid source 36, a temperature control system 38 comprising at least one temperature control unit 40, and an injection blow molding (IBM) machine 42.

The resin source 32 may be any apparatus for producing and/or storing resin suitable for being molded and hardened into one or more molded articles. For example, the resin provided at the resin source 32 may be polyolefin resin. The resin feed system 34 may be coupled in fluid-flow communication with the resin source 32 and configured to inject resin into cavities of a mold of the IBM machine 42, as described below.

The heat transfer fluid source 36 may be any system capable of providing an amount of heat transfer fluid sufficient to supply the heat transfer fluid to desired portions of the IBM machine 42 in a desired quantity and for a desired length of time during an injection molding process. For example, the heat transfer fluid source 36 may be a water supply or a supply of any fluid of a sufficient viscosity to freely flow throughout desired portions of the IBM machine 42. The heat transfer fluid may also have sufficient thermal characteristics to remain within a desired temperature range as it flows through the desired portions of the IBM machine 42, as described in detail below.

The temperature control system 38 may comprise one or more of the temperature control units 40 (e.g., thermolators) coupled in fluid-flow communication with the heat transfer fluid source 36 and operable to control the temperature of the heat transfer fluid within a predetermined temperature range. In some embodiments, a plurality of the temperature control systems 38 and/or a plurality of the temperature control units 40 may be provided. However, in some embodiments, only one temperature control unit 40 is used to control the temperature of heat transfer fluid injected into the IBM machine 42. The temperature control unit 40 may provide heat transfer fluid of a substantially uniform temperature to the desired portions of the IBM machine 42, as described in detail below.

As illustrated in FIG. 2, the IBM machine 42 may be configured for injection blow molding a plurality of parisons and/or molded articles. The IBM machine 42 may comprise an indexing head 44, an injection station 46, a blowing station 48, and an ejection station 50. The injection blow molding process performed with the IBM machine 42 may include inserting polyolefin resin at the injection station 46 to form the parisons while simultaneously passing a heat transfer fluid through heat transfer channels defined within the injection station 46 to regulate the temperature of the injection station 46, as described below. The injection blow molding process may then include actuating the indexing head 44 to transfer the resulting parisons from the injection station 46 to the blowing station 48 to be blow molded into molded articles. Next, the molded articles may be transferred via the indexing head 44 to the ejection station 50, where the parisons are then ejected from the IBM machine 42. The injection blow molding process described herein may be performed repetitively by the IBM machine 42. For example, the method steps described herein may be repeated at least 100, 1,000, or 10,000 consecutive times.

The indexing head 44 is configured for transferring the parisons from the injection station 46 to the blowing station 48 and then to the ejection station 50. The indexing head 44 may comprise a face block 52 on one or more outward-facing sides thereof, one or more core rod retainer plates 56 attached to the face blocks 52, and one or more core rods 54 attached to the core rod retainer plates 56. Each of the core rods 54 may be spaced a distance apart from adjacent core rods 54 and may be shaped according to a desired interior shape of the parisons to be formed thereon. In one embodiment of the IBM machine 42, the indexing head 44 may be configured to rotate the core rods 54 from the injection station 46 to the blowing station 48 and then to the ejection station 50 as directed by an operator or automated control devices (not shown). For example, the face blocks 52 may be arranged in a substantially triangular configuration with core rods 54 protruding from one or more sides of the triangular configuration, and the indexing head 44 may rotate approximately 120 degrees to move the core rods 54 on one side of the triangular configuration from the injection station 46 to the blowing station 48. In some embodiments of the injection blow molding system 30, the indexing head 44 may have core rods 54 protruding from each side, such that the injection station 46, blowing station 48, and ejection station 50 may each operate simultaneously on a different set of parisons or molded articles.

Figure 4:
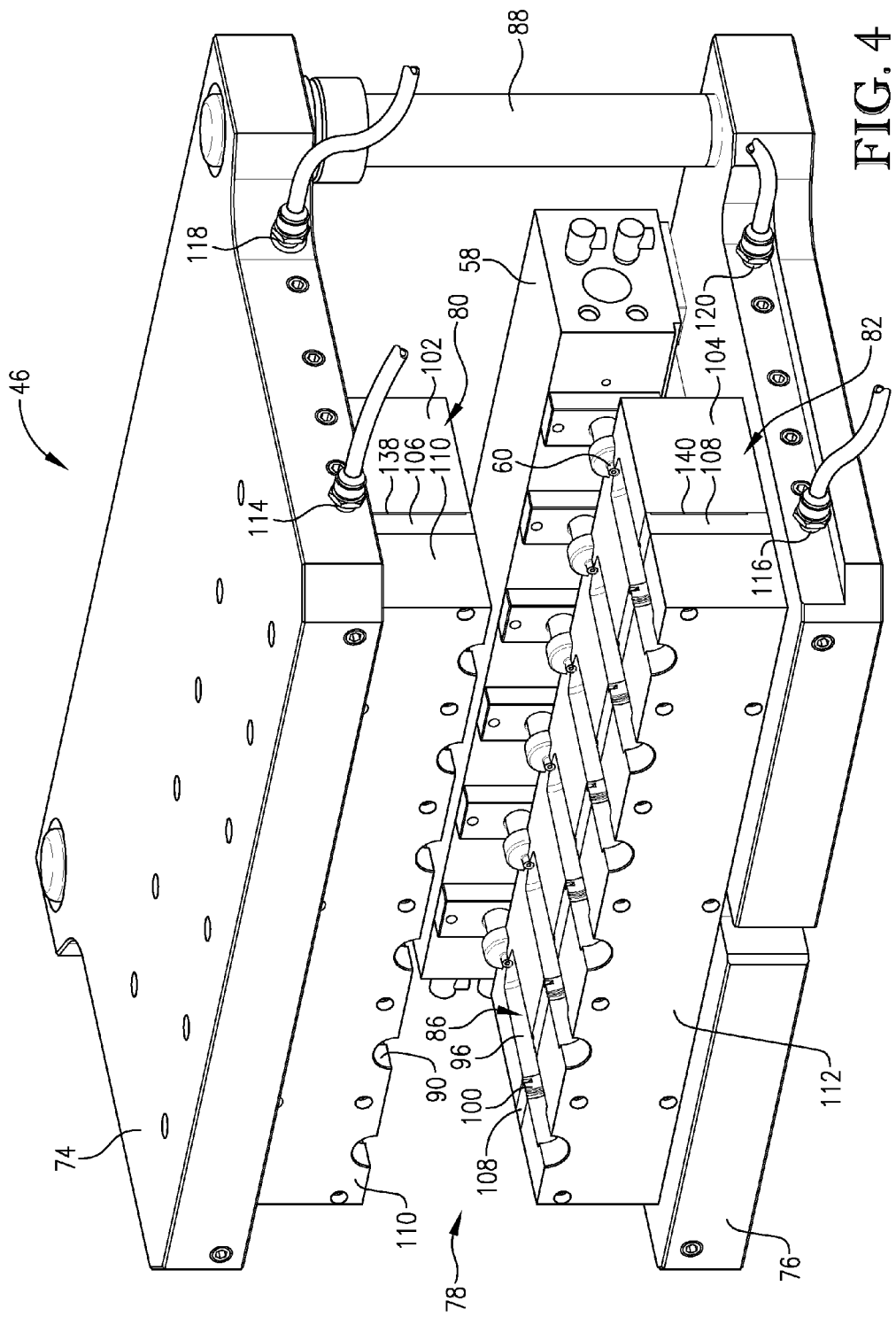
FIG. 4 is an isometric view of an injection station configured in accordance with a first embodiment of the present invention, particularly illustrating the injection station in an open position with two die sets attached to a split parison mold assembly comprising monolithic neck mold halves and monolithic body mold halves forming a plurality of parison cavities.
Figure 5:
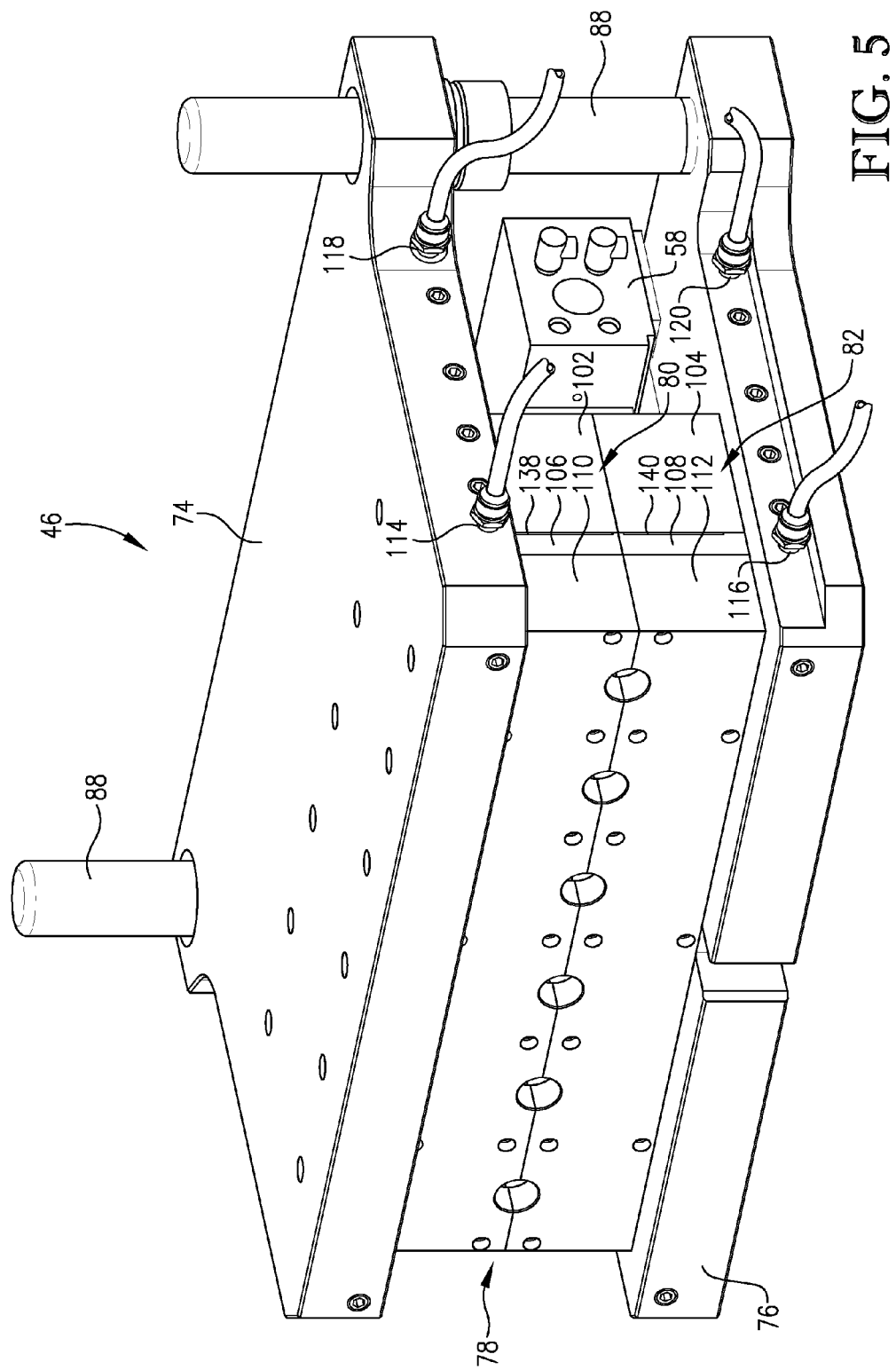
FIG. 5 is an isometric view of the injection station of FIG. 4 in a closed position.
Figure 6:
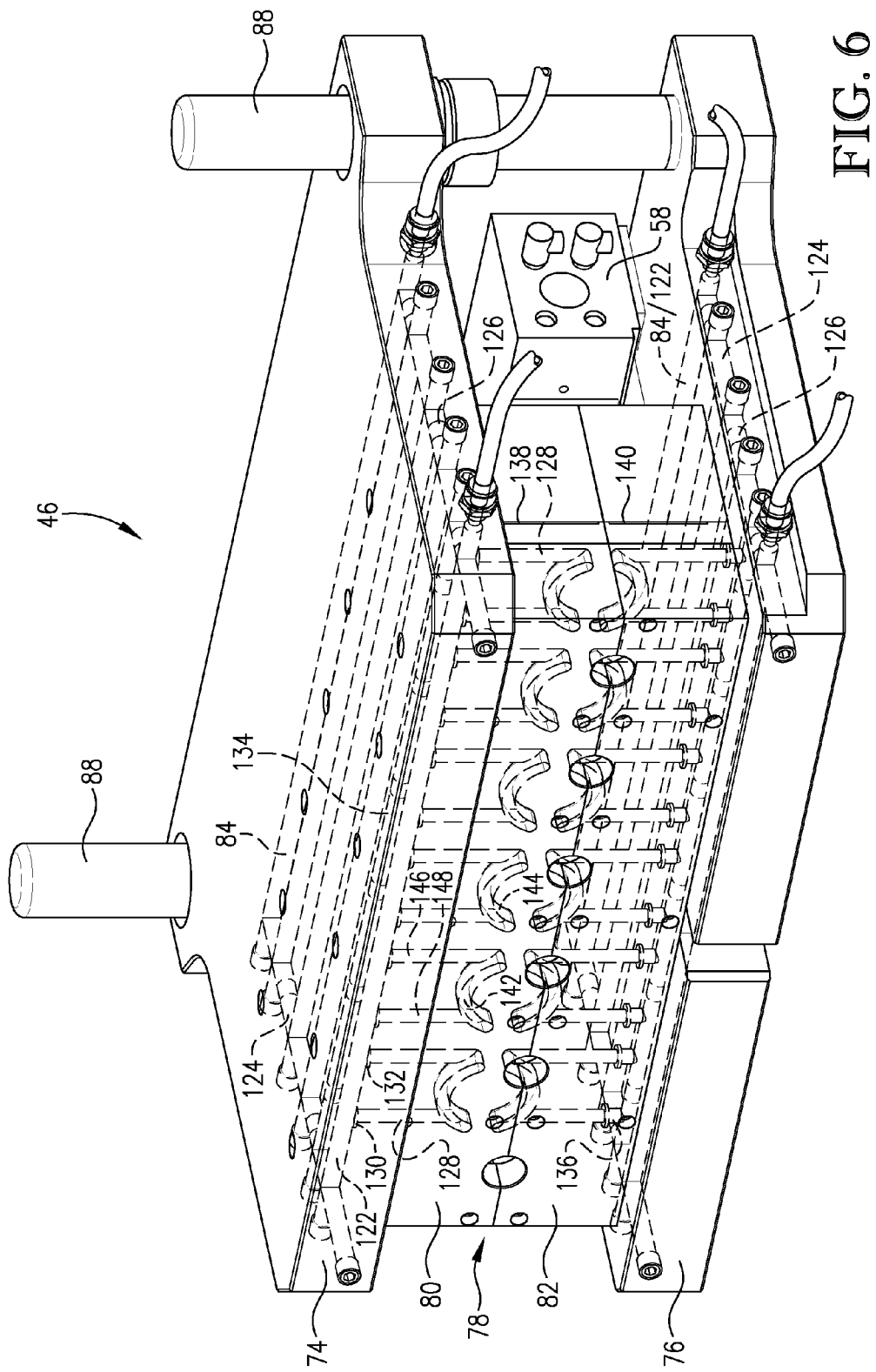
FIG. 6 is an isometric view of the injection station of FIG. 5 illustrating a plurality of heat transfer channels in phantom located within the die sets and the split parison mold assembly.
Figure 7:
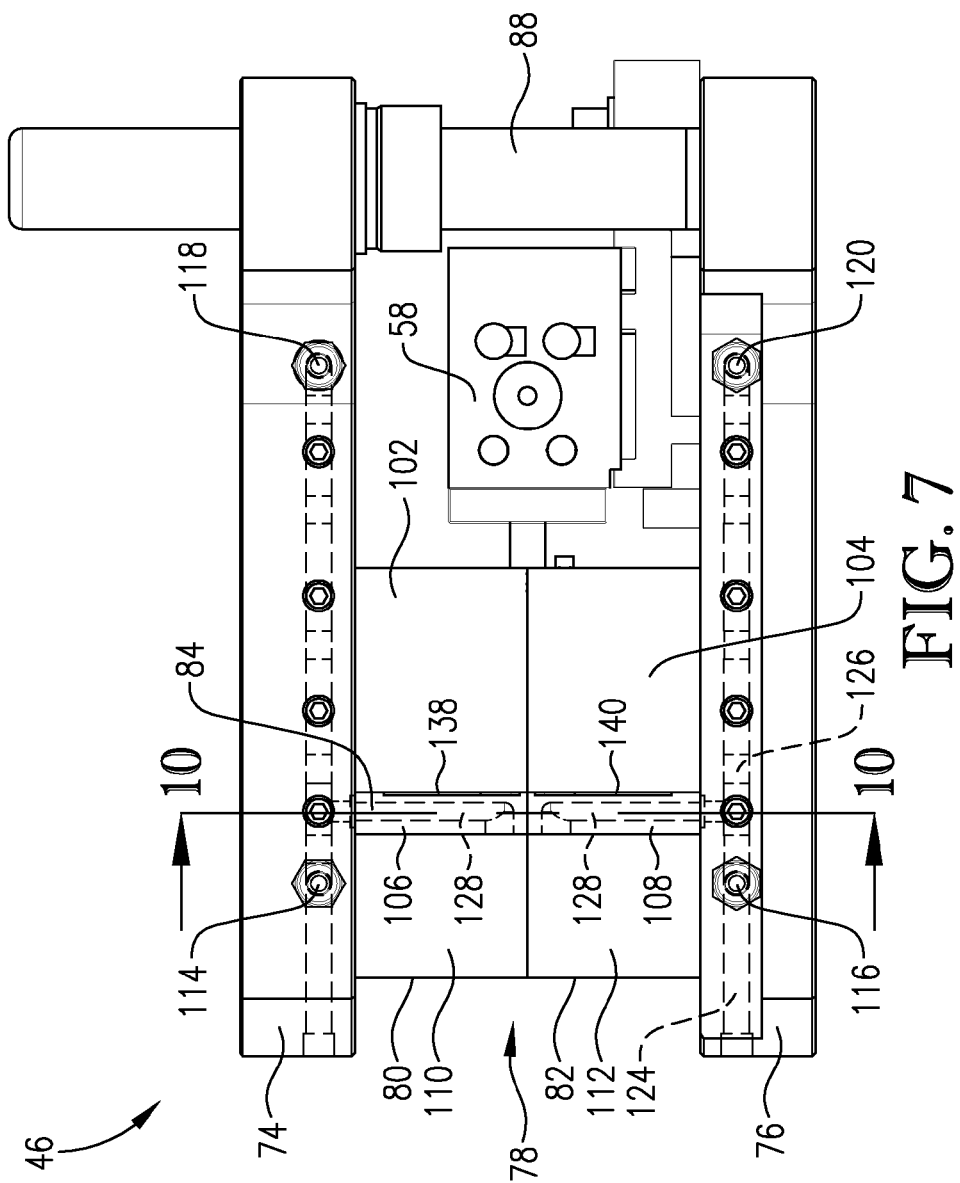
FIG. 7 is a side view of the injection station depicted in FIG. 5, particularly illustrating the interaction between the heat transfer channels in the die sets and the heat transfer channels in the neck mold halves and also showing an absence of heat transfer channels in the body mold halves.

The injection station 46 may be configured for injection molding the resin into the parisons. Specifically, the injection blow molding process may comprise injection molding a resin into a plurality of parisons at the injection station 46. As depicted in FIG. 1, the injection station may be fluidly coupled with the resin source 32, the resin feed system 34, the heat transfer fluid source 36, and the temperature control system 38 and/or unit 40. The injection station 46 may comprise at least a portion of the resin feed system 34, as illustrated in FIG. 4. For example, the resin feed system 34 may comprise or be fluidly coupled with an injection manifold 58 and one or more nozzles 60 positioned and configured for injecting resin into the one or more parison cavities.

Referring again to FIG. 2, the blowing station 48 may be configured for blow molding the parisons into the molded articles and the injection blow molding process may include the steps of transferring the parisons from the injection station 46 to the blowing station 48 and then blow molding the parisons formed at the injection station 46 into molded articles at the blowing station 48.

As shown in FIG. 3B, the blowing station 48 may comprise an upper die shoe 62, a lower die shoe 64, an upper mold half 66 coupled to the upper die shoe 62, and a lower mold half 68 coupled to the lower die shoe 64. The upper die shoe 62 and/or the lower die shoe 64 may be movable toward and away from each other, moving the blowing station 48 between an open position and a closed position. For example, the upper die shoe 62 and its corresponding upper mold half 66 may move upward and downward on a blowing station guide pin 70 fixed relative to the lower die shoe 64 and/or the lower mold half 68.

As shown in FIGS. 2 and 3C, the ejection station 50 may comprise a stripper plate 72 or any other device configured for pushing, pulling, dumping, or otherwise stripping the parisons off of the core rods 54 once they have been blow molded. For example, once the indexing head 44 moves the molded articles from the blowing station 48 to the ejection station 50, the stripper plate may be inserted adjacent to a top edge of the necks of the molded articles, between the necks and a center point of the indexing head 44. Then the stripper plate 72 may be moved laterally away from the center point of the indexing head 44, thus stripping the core rods 54 of the molded articles resting thereon.

In some embodiments of the IBM machine 42 described above, a conventional indexing head 44, blowing station 48, and/or ejection station 50 may be used. However, the injection station 46 disclosed herein may comprise a multitude of improvements over prior art injection stations. Referring now to FIGS. 3a and 4-7, in various embodiments of the IBM machine 42 described herein, the injection station 46 may comprise first and second die sets 74,76, a split parison mold assembly 78 comprising first and second parison mold halves 80,82 coupled to the first and second die sets 74,76 respectively, and a plurality of heat transfer channels 84 (dashed lines in FIGS. 6 and 7) defined within the die sets 74,76 and/or the split parison mold assembly 78 for regulating a temperature of the parison forming surfaces of the split parison mold assembly 78. The first and second parison mold halves 80,82 may also be referred to herein as first and second mold half assemblies. When the pair of first and second die sets 74,76 is shifted from an open position to a closed position, the first and second parison mold halves may cooperatively define one or more parison cavities 86. In some embodiments of the injection station 46, the first and/or second die sets 74,76 may slide along an injection station guide pin 88 when actuated between the open and closed positions.

The first and second die sets 74,76 (also referred to herein as upper and lower die sets of the injection station 46) may be formed of nickel plate or other die set materials known in the art. The die sets 74,76 may be shiftable between the open position and the closed position, as mentioned above. The injection blow molding process may therefore include a step of shifting the first and second die sets 74,76 of the injection molding station 46 from the open position to the closed position and from the closed position to the open position. At least one of the die sets 74,76 may be configured to actuate toward and away from the other of the die sets 74,76. For example, the first die set 74 may move toward and away from the second die set 76 along the injection station guide pin 88.

Figure 13:
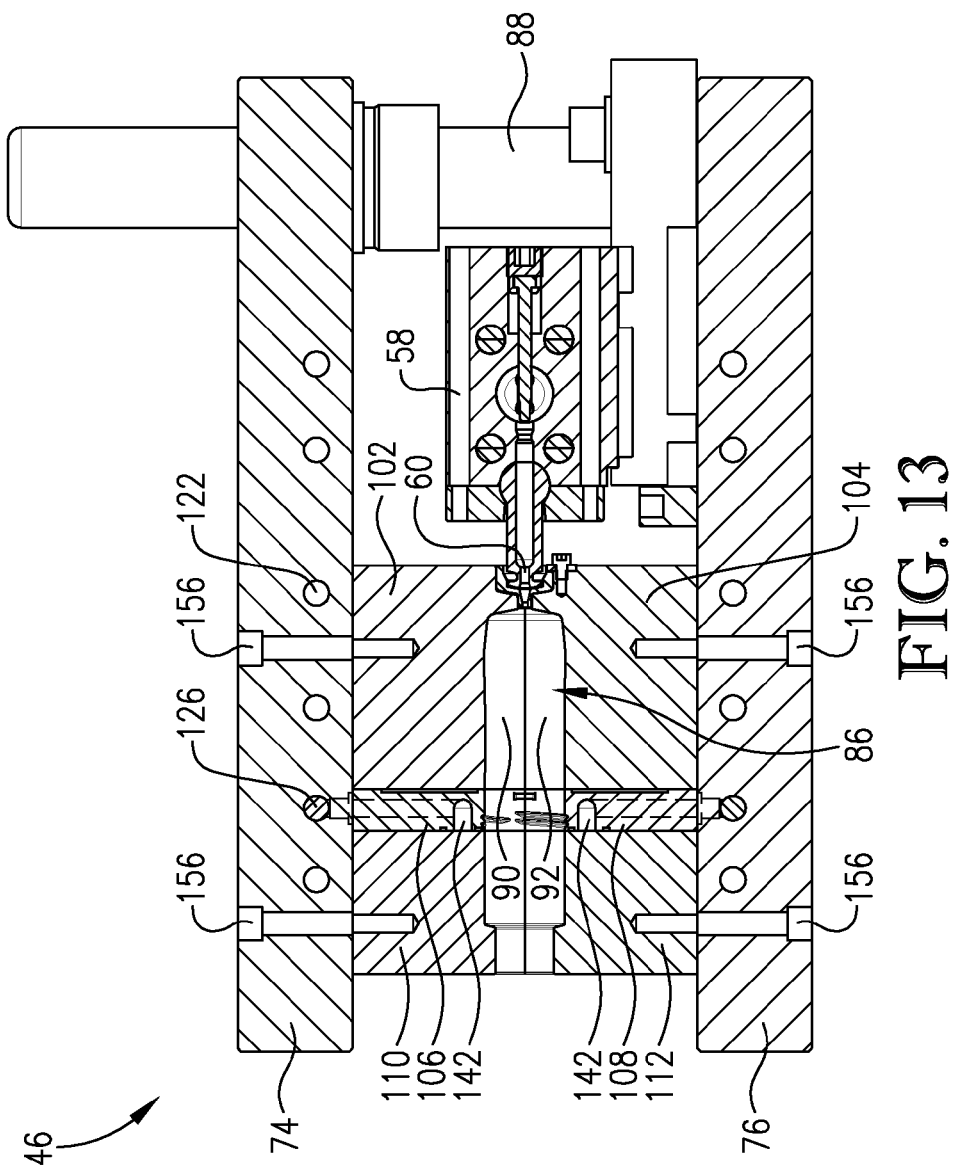
FIG. 13 is a cross-sectional side view of the injection station taken along line 13-13 in FIG. 9.

The first and second parison mold halves 80,82 of the split parison mold assembly 78 may be directly coupled to the first and second die sets 74,76 respectively. As used herein, the term "directly coupled" denotes connection of a first component to a second component in a manner such that at least a portion of the first and second components physically contact one another. The first parison mold half 80 may have a first parison cavity surface 90 (FIG. 13) and the second parison mold half 82 may have a second parison cavity surface 92 (FIG. 13). When the split parison mold assembly 78 is in the closed position, the first and second parison cavity surfaces 90,92 may define the one or more parison cavities 86 within which the resin is received. The resin feed system 34 may be coupled in fluid-flow communication with the parison cavities 86 and operable to inject the resin into the parison cavities 86.

The injection blow molding process may include injection molding a polyolefin resin into a plurality of parisons at the injection station 46. This injection molding process may comprise shifting the split parison mold assembly 78 from the open position to the closed position, then introducing or injecting the resin, such as polyolefin resin, into the parison cavities 86 cooperatively defined by the first and second parison cavity surfaces 90,92 of the split parison mold assembly 78 when the split parison mold assembly 78 is in the closed position. The resin fills the parison cavities 86 and may remain therein until it hardens to a point at which it can at least temporarily hold its shape when the split parison mold assembly 78 is opened. Then the die sets 74,76 may be shifted from the closed position to the open position and the parisons may be removed from the parison mold halves 80,82 while the die sets 74,76 are in the open position.

Figure 14:
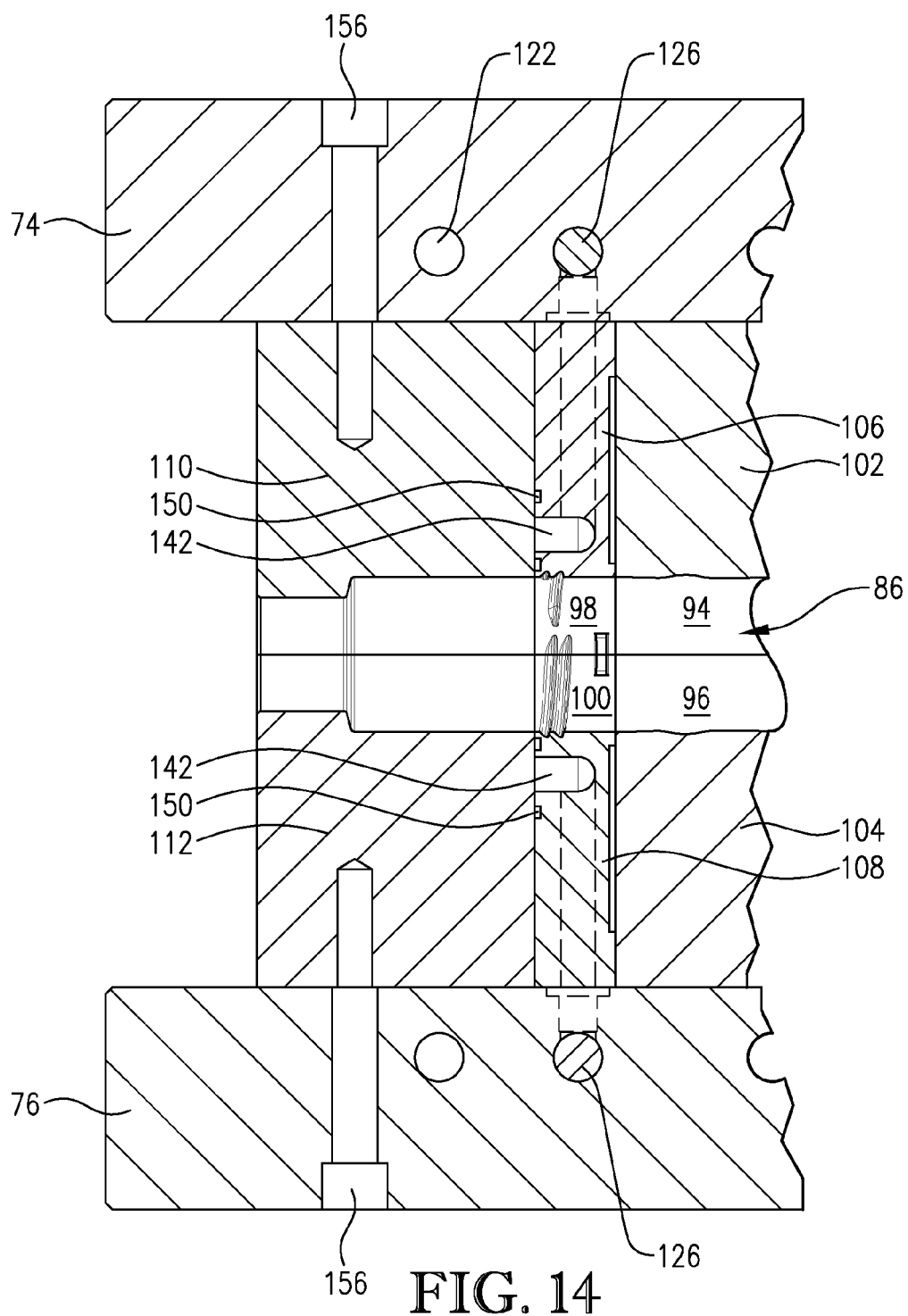
FIG. 14 is a fragmentary, cross-sectional, enlarged side view of the neck mold halves as illustrated in FIG. 14, particularly illustrating how the portion of the heat transfer channel closest to the surface of the parison cavity is cooperatively defined by the neck mold halves and interlock insert halves.

As perhaps best illustrated in FIGS. 13 and 14, each of the parison cavity surfaces 90,92 may comprise a body-forming surface 94,96 for defining the exterior shape of the bodies of the parisons and a neck-forming surface 98,100 for defining the exterior shape of the necks of the parisons when the split parison mold 78 is in the closed position.

In various embodiments of the injection station 46, the split parison mold assembly 78 may comprise first and second body mold halves 102,104, first and second neck mold halves 106,108, and first and second interlock insert halves 110,112 coupled to the first and second die sets 74,76 respectively. The neck-forming surfaces 98,100 (FIG. 14) may be formed into the neck mold halves 106,108 and the body-forming surfaces 94,96 may be formed into the body mold halves 102,104, respectively.

In some embodiments of the injection station 46, the body mold halves 102,104 are each monolithic components having a plurality of the parison body-forming surfaces 94,96 formed therein via a molding or milling manufacturing process. As used herein, the term "monolithic" means formed of a single body or member; not of multiple bodies or members fastened together. The monolithic body mold halves 102,104 may be configured such that the first body mold half 102 and the second body mold half 104 cooperatively define the exterior shape of the bodies of at least two, at least four, or at least six of the parisons. In other embodiments of the injection station 46, as described below, the body mold halves 102,104 may each comprise a plurality first body mold halves 102 and a plurality of second body mold halves 104 each independently coupled to one of the die sets 74,76, with each first body mold half 102 and each corresponding second body mold half 104 comprising at least one body-forming surface 94,96 formed therein.

The first and second neck mold halves 106,108 can be directly coupled to the first and second die sets 74,76 respectively, and are disposed between the first and second body mold halves 102,104 and the first and second interlock inserts 110,112 respectively.

In some embodiments of the injection station 46, the neck mold halves 106,108 are each monolithic components having a plurality of the parison neck-forming surfaces 98,100 formed therein via a molding or milling manufacturing process. The monolithic neck mold halves 106,108 may be configured such that the first neck mold half 106 and the second neck mold half 108 cooperatively define the exterior shape of the necks of at least two, at least four, or at least six of the parisons.

In other embodiments of the injection station 46, as described below, the neck mold halves 106,108 may each comprise a plurality first neck mold halves 106 and a plurality of second neck mold halves 108 each independently coupled to one of the die sets 74,76, with each first neck mold half 106 and each corresponding second neck mold half 108 comprising at least one neck-forming surface 98,100 formed therein.

The first and second interlock inserts 110,112 (also referred to herein as interlock insert halves) may be directly coupled to the first and second die sets 74,76 respectively, adjacent to the first and second neck mold halves 106,108. The first and second neck mold halves 106,108 may be disposed between the first and second interlock inserts 110,112 and the first and second body mold halves 102,104 respectively. The interlock insert halves 110,112 along with the first and second neck mold halves 106,108 may cooperatively form at least a portion of the heat transfer channels 84, as later described herein.

The heat transfer channels 84, as illustrated in FIGS. 6-10, are formed in the die sets 74,76 and/the parison mold halves 80,82 and are configured to receive the heat transfer fluid. For example, the heat transfer channels 84 may be configured to receive heat transfer fluid from the heat transfer fluid source 36 and pass the heat transfer fluid from heat transfer channels 84 defined within the first and second die sets 74,76 into heat transfer channels 84 defined within the first and second parison mold halves 80,82 respectively. Heat transfer fluid may be passed through the plurality of heat transfer channels 84 defined within the injection station 46 to regulate the temperature of at least a portion of the parison cavity surfaces 90,92.

The heat transfer channels 84 may be coupled in fluid-flow communication with the heat transfer fluid source 36 and the temperature control system 38. The temperature control system 38 may thus control the temperature of the heat transfer fluid fed into the heat transfer channels 84. In some embodiments of the injection blow molding system 30, there may be one or more temperature control systems 38 or temperature control units 40, but only one of the temperature control units 40 may be associated with the injection station 46 and its heat transfer channels 84. The injection molding process described herein may therefore further comprise passing the heat transfer fluid from a single temperature control unit 40 through all the heat transfer channels 84 defined within the injection station 46. In some embodiments of the injection blow molding system 30, all of the heat transfer fluid passed through the heat transfer channels 84 enters the injection station 46 at substantially the same temperature.

The injection station 46 may define one or more inlets 114,116 for receiving the heat transfer fluid from the temperature control unit 40 and one or more outlets 118,120 for allowing fluid to flow out of the heat transfer channels. In some embodiments of the injection blow molding system 30, the injection station 46 may define no more than two inlets 114,116 for receiving the heat transfer fluid from the temperature control unit 40 into the heat transfer channels 84. For example, each of the first and second die sets 74,76 may comprise only one inlet 114,116, respectively, for receiving fluid to be passed through all of the heat transfer channels 84 defined with that die set and associated parison mold half.

As noted above, at least a portion of the heat transfer channels 84 may be defined within the first and second die sets 74,76. Furthermore, at least a portion of the heat transfer channels 84 may be defined within the first and second parison mold halves 80,82. For example, at least a portion of the heat transfer channels 84 may be defined within the first and second neck mold halves 106,108 of the first and second parison mold halves 80,82. The heat transfer channels 84 defined within the first and second parison mold halves 80,82 may be connected in fluid-flow communication with at least a portion of the heat transfer fluid channels 84 defined within the first and second die sets 74,76. For example, heat transfer fluid can be supplied to heat transfer channels 84 defined within the first and second parison mold halves 80,82 by heat transfer channels 84 defined within the first and second die sets 74,76 respectively.

Figure 8:
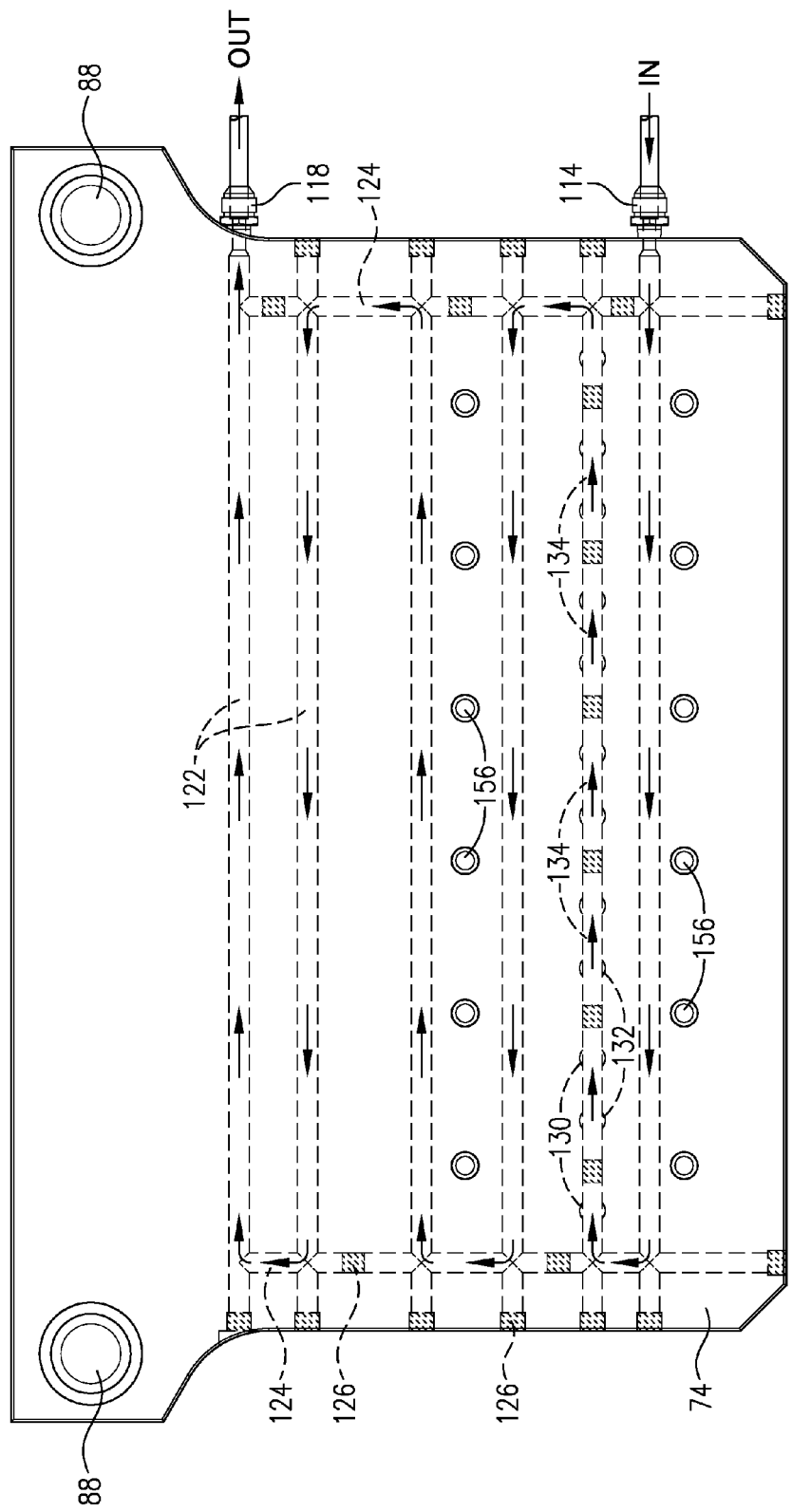
FIG. 8 is a top view of the injection station of FIG. 5 illustrating the heat transfer channels in phantom and includes arrows depicting the direction of flow of heat transfer fluid through the heat transfer channels from an inlet to an outlet thereof.

As perhaps best illustrated in FIG. 8, all of the heat transfer channels 84 defined within the first die set 74 may be connected in serial fluid-flow communication, and all of the heat transfer channels 84 defined within the second die set 76 may be connected in serial fluid-flow communication. As used herein, "serial fluid-flow communication" denotes the connection of multiple fluid carrying bodies or channels in a manner such that fluid flows sequentially through the multiple bodies or channels. The heat transfer channels 84 defined within each of the first and second die sets 74,76 may comprise a plurality of spaced-apart, substantially linear channels 122. In some embodiments of the injection station 46, each of the die sets may comprise a minimum of 2, 3, or 4 of the linear channels 122 and a maximum of 40, 20, or 8 of the linear channels 122. Each of the linear channels 122 may have a length of at least 6, 12, or 16 inches and/or not more than 60, 48, or 36 inches. Furthermore, the linear channels 122 may extend substantially parallel to one another. The average lateral spacing between adjacent ones of the linear channels 122 may be at least 0.5, 0.75, 1.0, or 1.25 inches and/or not more than 8, 6, 4, or 2 inches. Furthermore, the average diameter of the linear channels 122 in the die sets 74,76 may be at least 0.05, 0.15, or 0.25 inches and/or not more than 3.0, 1.5, or 0.75 inches.

As mentioned above, the linear channels 122 may be coupled in serial fluid-flow communication with one another. For example, one or more crossing heat transfer channels 124 may be positioned proximate one or more ends of the linear channels 122 and may provide fluid communication between adjacent ones of the linear channels 122. For example, the linear channels 122 and the crossing channels 124 may cooperatively define heat transfer channels that snake back and forth laterally across each of the die sets 74,76. For example, the heat transfer fluid may travel in a first direction through a first one of the linear channels 122, enter a first one of the crossing channels 124 or a first portion of one of the crossing channels 124, and then flow in a second, opposite direction through a second one of the linear channels 122. In some embodiments of the injection station 46, plugs 126 may be strategically placed throughout the linear channels 122 and/or the crossing channels 124, thereby directing the flow of the heat transfer fluid, as illustrated in FIG. 8. Furthermore, the plugs 126 may also be placed at or into each end of the linear and crossing channels 122,124 to prevent heat transfer fluid from entering or exiting at any locations other than the inlets 114,116 and outlets 118,120.

Figure 10:
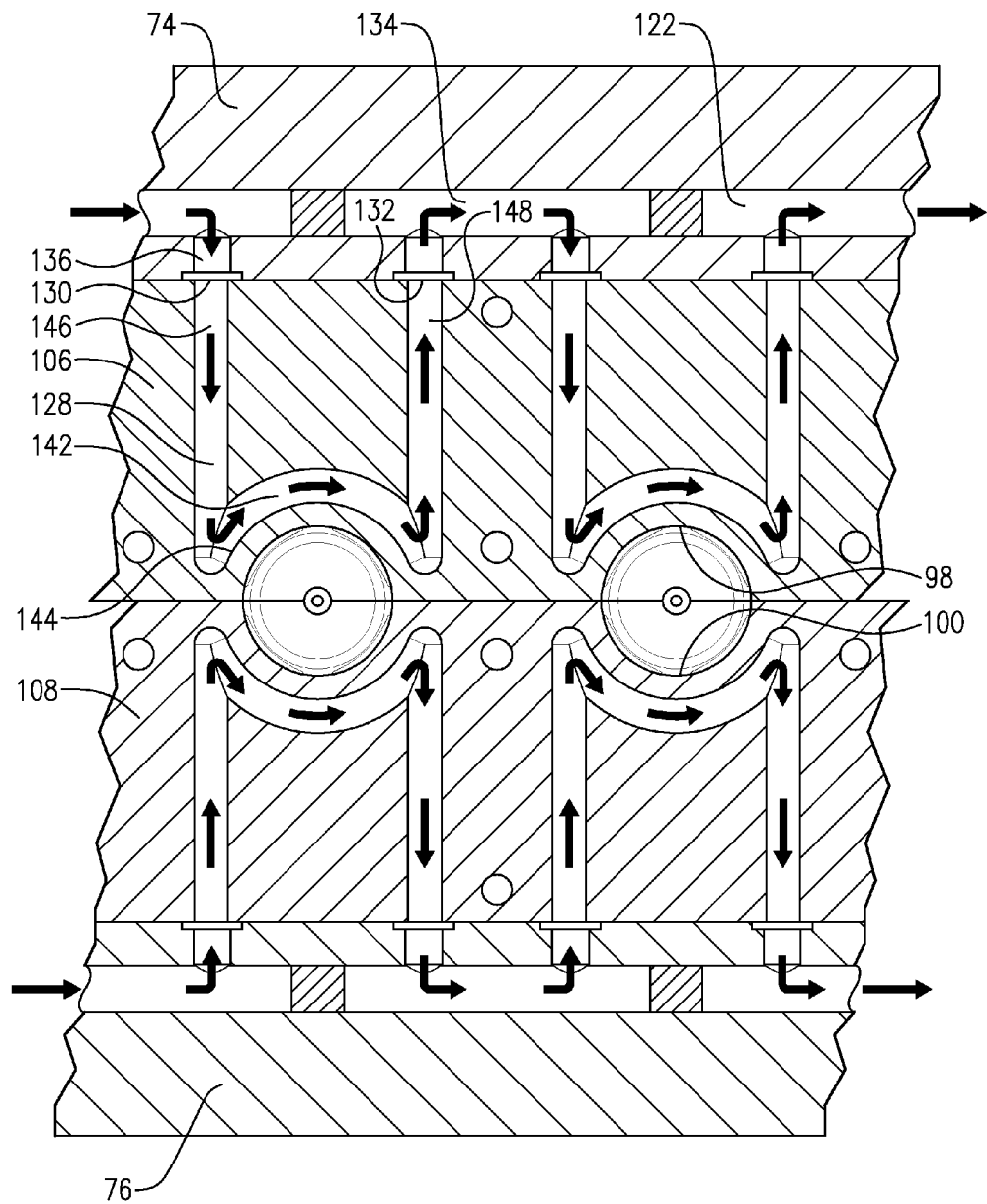
FIG. 10 is a fragmentary cross-sectional view of the heat transfer channels taken along line 10-10 in FIG. 7, including arrows depicting the direction of flow of heat transfer fluid through the heat transfer channels in the die sets to the heat transfer channels in the neck mold halves.
Figure 11:
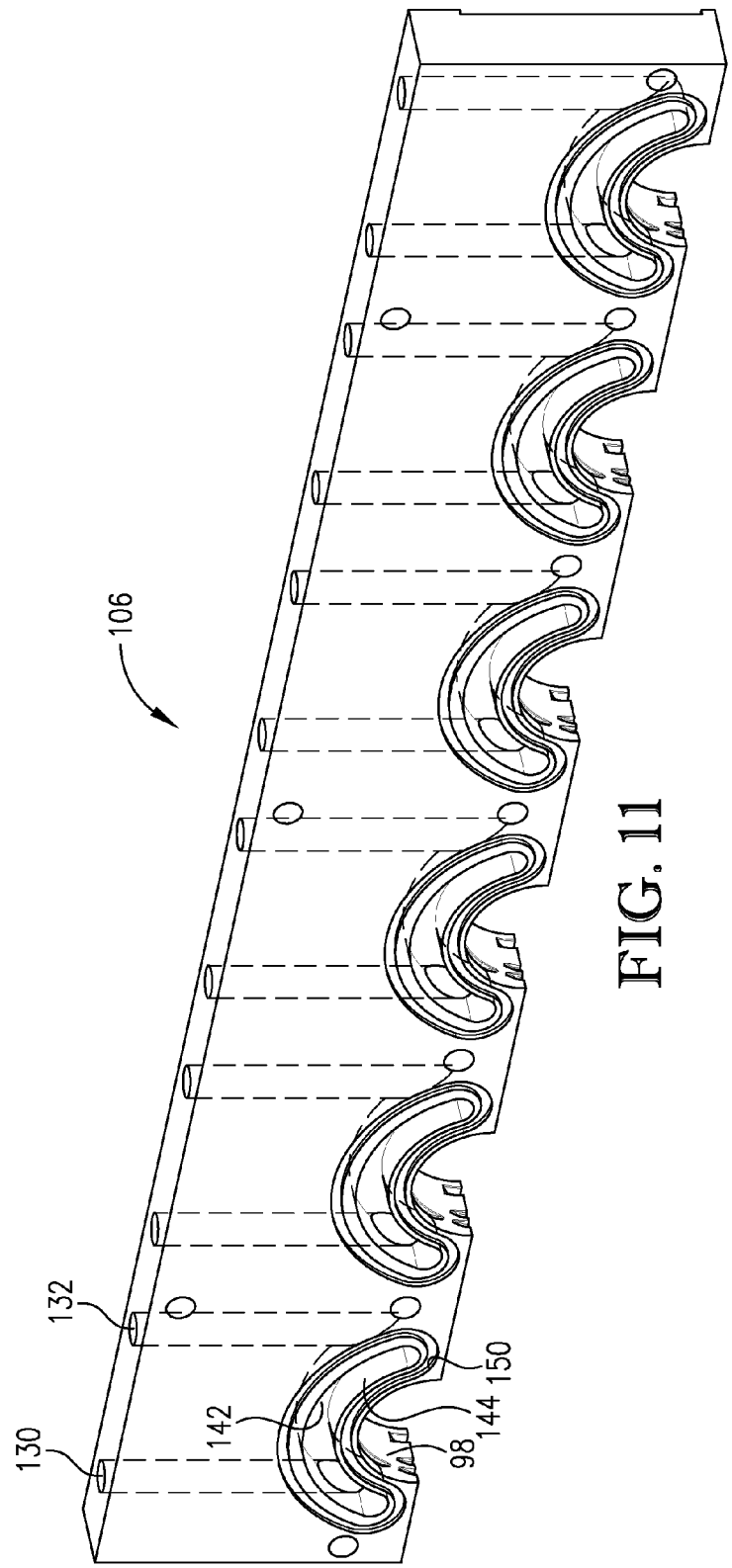
FIG. 11 is an isometric view of the upper neck mold half of FIG. 4 illustrating the open-sided configuration of the contoured heat transfer channels, as well as the interlock seal recesses formed around the contoured channels.
Figure 12:
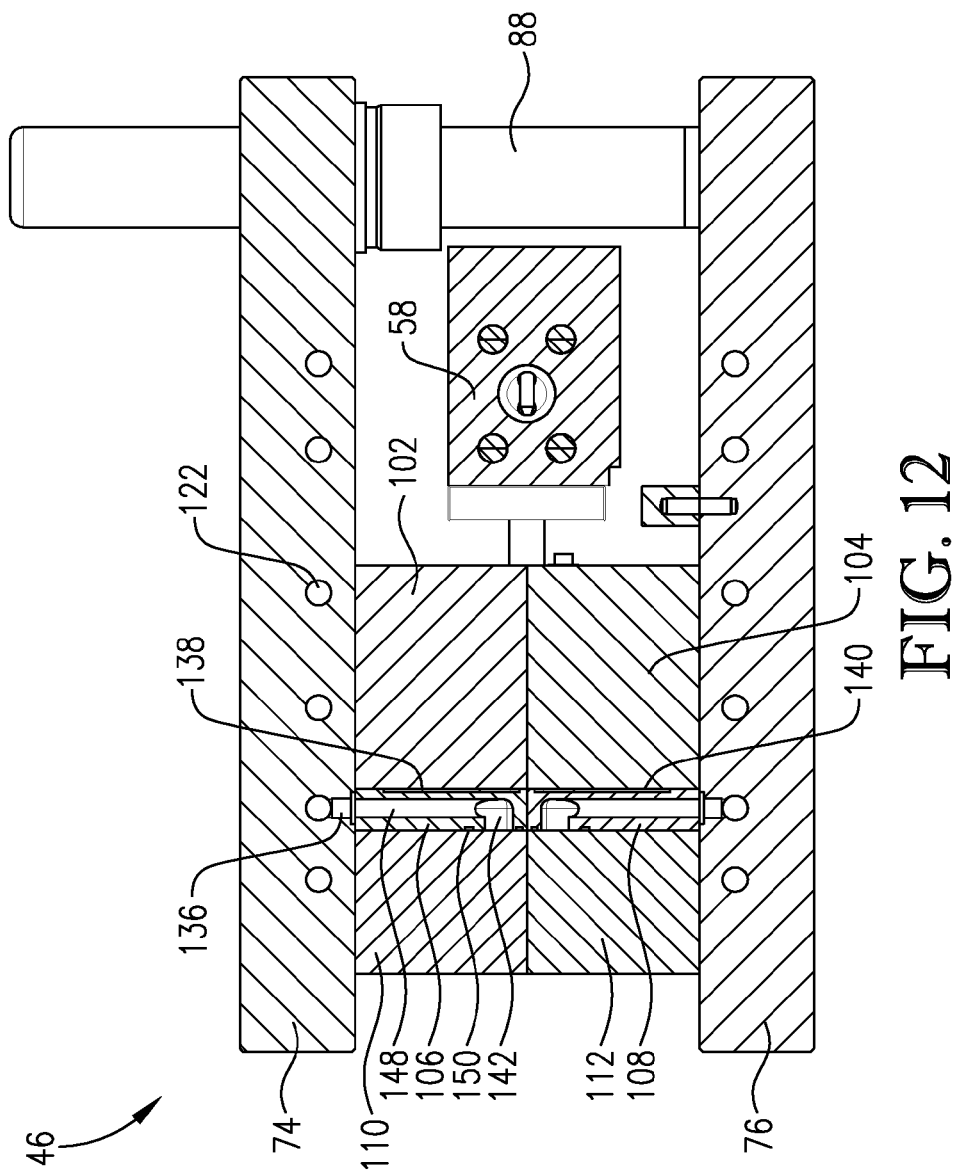
FIG. 12 is cross-sectional side view of the injection station taken along line 12-12 in FIG. 9.

At least a portion of the heat transfer channels 84 defined within the die sets 74,76 connect the heat transfer channels 84 defined within the parison mold halves 80,82 in serial fluid-flow communication with one another. As illustrated in FIG. 10, the parison mold halves 80,82 may each define at least two spaced-apart heat transfer channels, referred to herein as mold half channels 128. The mold half channels 128 may be formed in the body mold halves 102,104 and/or the neck mold halves 106,108, as later described herein. Specifically, the first and second die sets 74,76 may each comprise at least one connecting heat transfer channel or one connecting portion of one of the linear channels that provides fluid communication between the mold half channels 128. For example, the mold half channels 128 may each have an inlet end 130 and an outlet end 132 in fluid communication with at least one of the linear channels 122 in the die sets. The linear channel 122 may have one of the plugs 126 placed therein between the inlet end 130 and the outlet end 132 of one of the mold half channels 128 to redirect the heat transfer fluid into that mold half channel 128. The space between adjacent ones of the plugs 126 within the linear channels 122 in fluid communication with the mold half channels 128 may be referred to herein as a connecting portion or a connecting heat transfer channel 134, because it fluidly connects the outlet end 130 of one mold half channel 128 with the inlet end 132 of another mold half channel 128, as illustrated in FIG. 10.

The inlet end 130 and the outlet end 132 of the mold half channels 128 may each be fluidly connected with the at least one of the linear channels 122 via extension channels 136. In some embodiments of the injection station 46, the extension channels 136 may extend downward from and substantially perpendicular to at least one of the linear channels 122.

In some embodiments of the injection station 46, the total volume of the heat transfer channels 84 may be at least 10, 20, or 40 cubic inches and/or not more than 500, 250, or 100 cubic inches. Additionally, the total volume of the heat transfer channels 84 defined within the first and second die sets 74,76 may be at least 5, 15 or 30 cubic inches and/or not more than 400, 200, or 80 cubic inches. The total volume of the heat transfer channels 84 defined within the first and second parison mold halves 80,82 may be at least 1, 3, or 5 cubic inches and/or not more than 100, 50, or 20 cubic inches. The total volume of the heat transfer channels 84 defined within the first and second body mold halves 102,104 may be less than 30, 15, or 5 cubic inches, and the total volume of the heat transfer channels 84 defined within the first and second neck mold halves 106,108 may be at least 1, 3, or 5 cubic inches and/or not more than 100, 50, or 20 cubic inches.

The ratio of the total volume of the heat transfer channels 84 defined within the die sets 74,76 to the total volume of heat transfer channels 84 defined in the split parison mold assembly 78 may be at least 1:1, 2.5:1, or 3.5:1 and/or not more than 20:1, 12:1, or 8:1. The ratio of the total volume of the heat transfer channels 84 defined within the die sets 74,76 to the total volume of heat transfer channels 84 defined in the body mold halves 102,104 may be at least 1:1. Thus, less than 50, 30, 25, 15, or 10 percent of the total volume of the heat transfer channels 84 in the injection station 46 may be defined within the body mold halves 102,104. For example, in some embodiments of the injection station 46 none of the heat transfer channels 84 are defined within the body mold halves 102,104. In various embodiments of the injection station 46, at least 50, 60, or 70 percent of the total volume of the heat transfer channels 84 is located in heat transfer channels that are spaced more than 1, 3, or 5 inches from the parison cavity surfaces 90,92.

In some embodiments of the injection station 46, at least 20, 30, 50, or 70 percent and/or not more than 98, 95, or 90 percent of the total volume of the heat transfer channels 84 is defined within the die sets 74,76. In some embodiments of the injection station 46, at least 2, 5, or 10 percent and/or not more than 80, 50, or 30 percent of the total volume of the heat transfer channels 84 is defined within the split parison mold assembly 78. In some embodiments of the injection station 46, at least 2, 5, or 10 percent and/or not more than 80, 50, or 30 percent of the total volume of the heat transfer channels 84 may be defined within the neck mold halves 106,108.

It may be desirable for the body-forming surfaces 94,96 of the parison molds 80,82 to stay within target temperature ranges during the injection molding process. In some embodiments of the injection station 46, the target surface temperature of the body-forming surfaces (i.e., the target body surface temperature) may be at least 190, 200, or 205° F. and/or not more than 230, 220, or 215° F.

During the injection molding, while the resin is received in the parison cavities 86, the surface temperature of at least 70, 80, or 90 percent of the total surface area of the body-forming surfaces 94,96 of the split parison mold assembly 78 may be maintained at or within 20, 10, or 5° F. of the target body surface temperature. For example, a target body surface temperature may be 210° F., and during the injection molding, the temperature of at least 90 percent of the total surface area of the body-forming surfaces 94,96 may be maintained between 205 and 215° F.

During the injection molding, the temperature of at least 70, 80, or 90 percent of the total surface area of the neck-forming surfaces 98,100 may be maintained within 20, 10, or 5° F. of a target neck surface temperature. For example, the temperature of at least 70, 80, or 90 percent of the total surface area of the neck-forming surfaces 98,100 may be maintained within a range having a minimum of 50 or 75° F. and a maximum of 150 or 175° F. In some embodiments of the injection station 46, the target neck surface temperature may be at least 10, 25, or 50° F. less than the target body surface temperature. For example, if the target neck surface temperature is in the range of 50 to 175° F. then the target body surface temperature may be in the range of 190 to 230° F. In one example embodiment of the injection station 46, the target body surface temperature may be 210° F., and the target neck surface temperature may be at least 25° F. less than the target body surface temperature.

In some embodiments of the injection station 46, at least 75, 90, or 100 volume percent of the heat transfer fluid introduced into the heat transfer channels 84 is introduced at an inlet temperature that is at or within 20, 10, or 5° F. of a target inlet temperature. The target inlet temperature may be at least 40, 50, or 60° F. and/or not more than 150, 100, or 90° F. The temperature of the heat transfer fluid may be controlled in a single temperature control unit 40 (e.g., thermolator) prior to introducing the heat transfer fluid into the heat transfer channels 84.

In certain embodiments, the neck mold halves 106,108 may be coupled to the die sets 74,76 independently of the body mold halves 102,104. A first insulating gap 138 may be defined between at least a portion of the first body mold half 102 and the first neck mold half 106, and a second insulating gap 140 may be defined between at least a portion of the second body mold half 104 and the second neck mold half 108.

As noted above, at least a portion of the heat transfer channels 84 may be defined within the first and second neck mold halves 106,108. For example, at least some of the spaced-apart heat transfer channels or mold half channels 128 may be partially or entirely defined within the first and second neck mold halves 106,108. In some embodiments of the injection station 46, at least a portion of the heat transfer channels 84 defined within the first and second neck mold halves 106,108 may be spaced at least 0.05, 0.1, or 0.15 inches and/or not more than 2, 1, or 0.5 inches from the neck-forming surfaces 98,100. In some embodiments of the injection station 46, all of the heat transfer channels 84 that are spaced less than 1 inch from the first and second parison cavity surfaces 90,92 are defined within the neck mold halves 106,108.

The heat transfer channels 84 defined in the first and second neck mold halves 106,108 may include a plurality of contoured channels 142 associated with the neck-forming surfaces 98,100. As perhaps best shown in FIG. 15, the curvature of the contoured channels 142 may substantially correspond to the curvature of the necks of the parisons to be formed at the injection station 46. Specifically, the contoured heat transfer channels 142 may include an inner face 144 having a shape that substantially corresponds to the shape of the neck-forming surface 98,100 with which it is associated.

Figure 15:
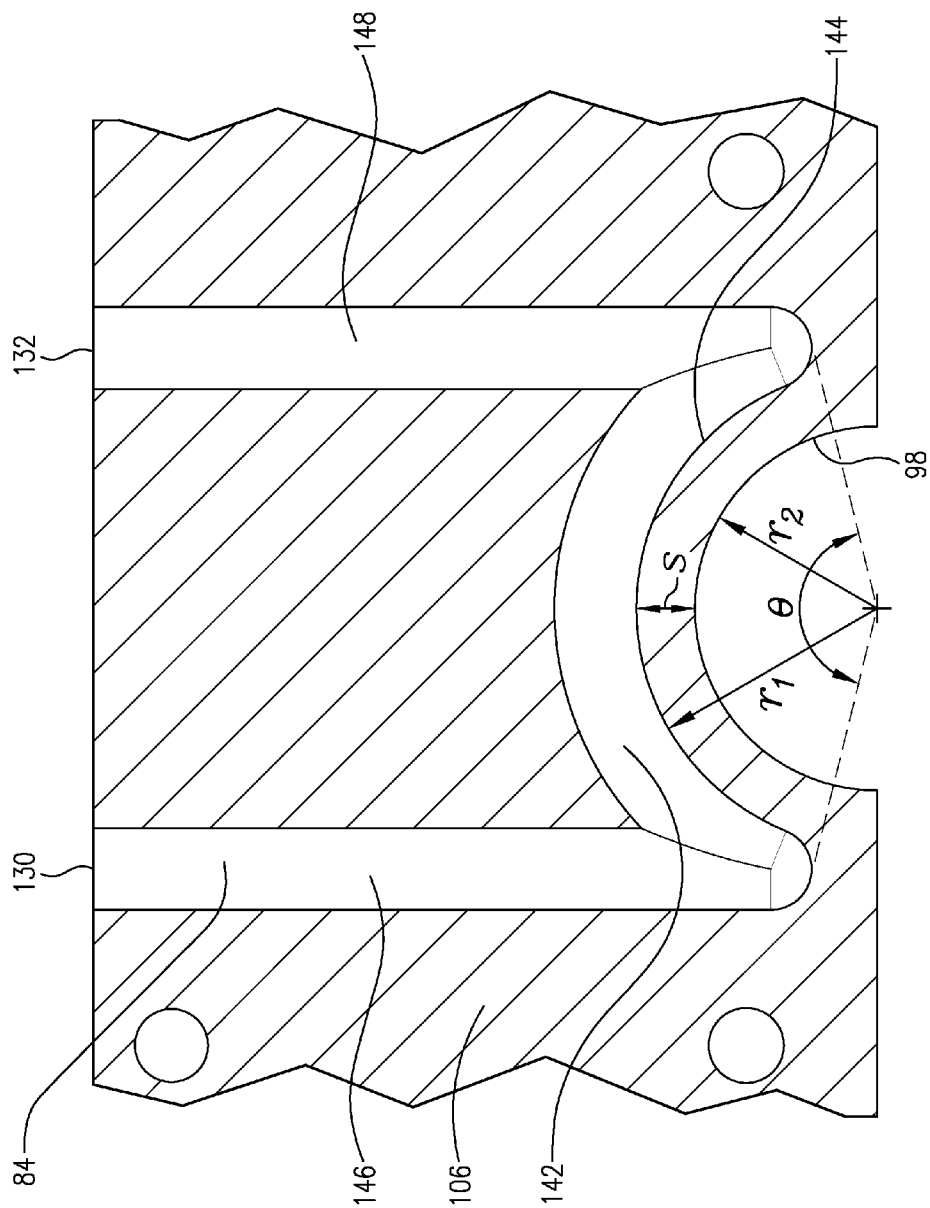
FIG. 15 is a fragmentary, cross-sectional, enlarged front view of one of the heat transfer channels in one of the neck mold halves, illustrating relationships between a neck-forming surface and its corresponding contoured channel.
Figure 16:
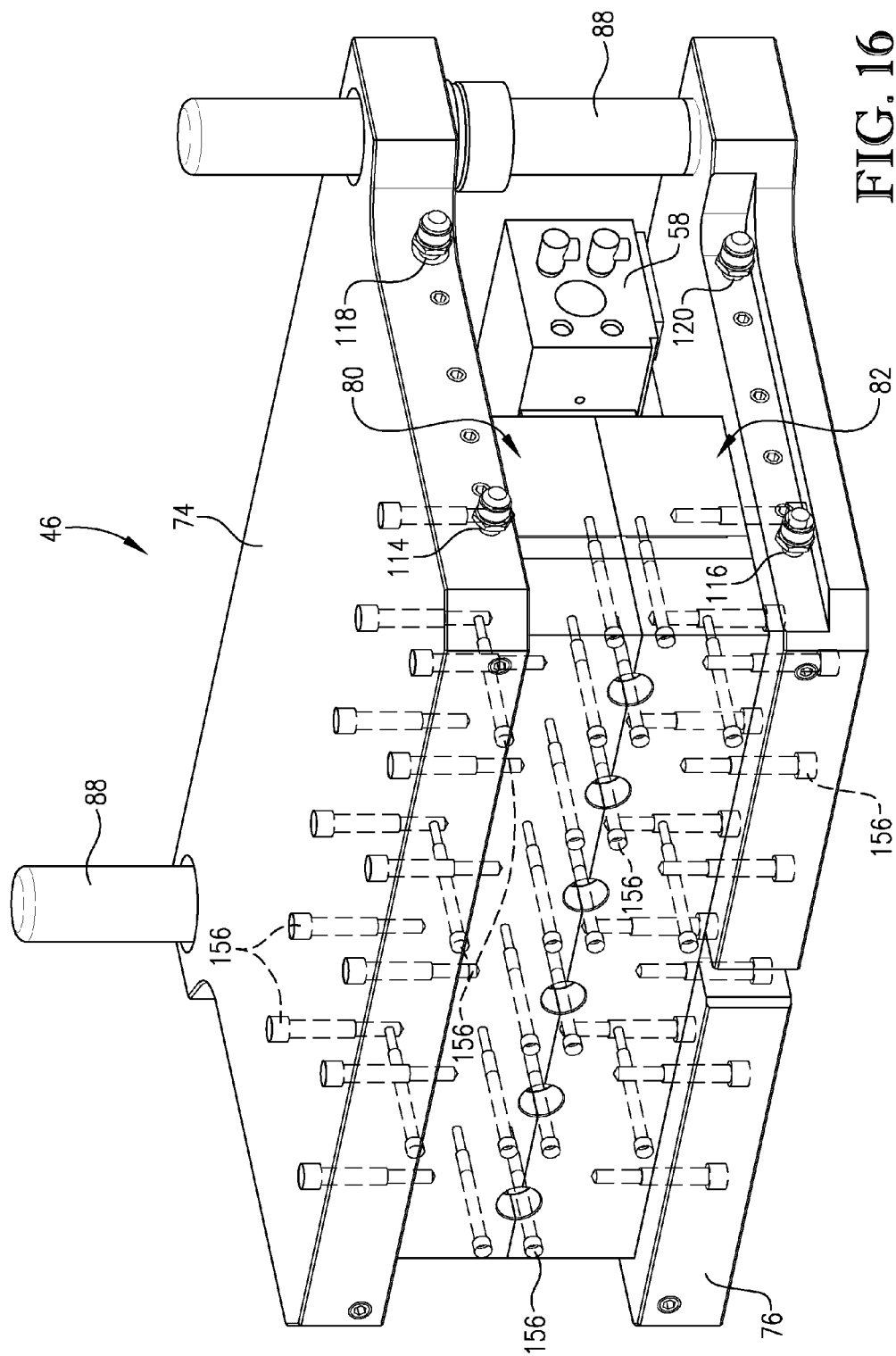
FIG. 16 is an isometric view of the injection station of FIG. 5 and illustrates a plurality of mechanical fasteners joining the split parison mold assembly with the die sets.
Figure 17:
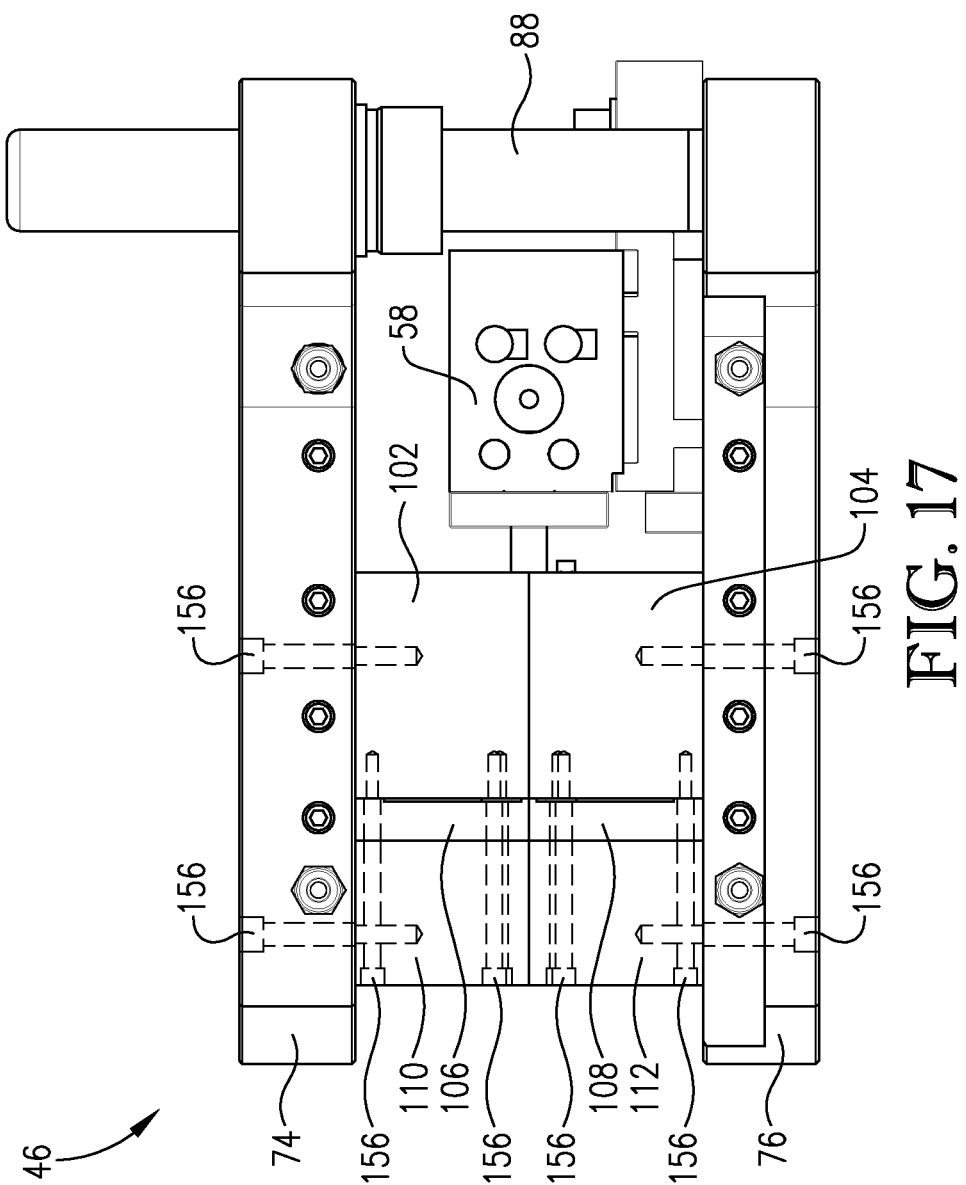
FIG. 17 is a side view of the injection station depicted in FIG. 5, particularly illustrating the mechanical fasters joining the interlock insert halves, neck mold halves, and body mold halves together and to the first and second die sets, respectively.
Figure 18:
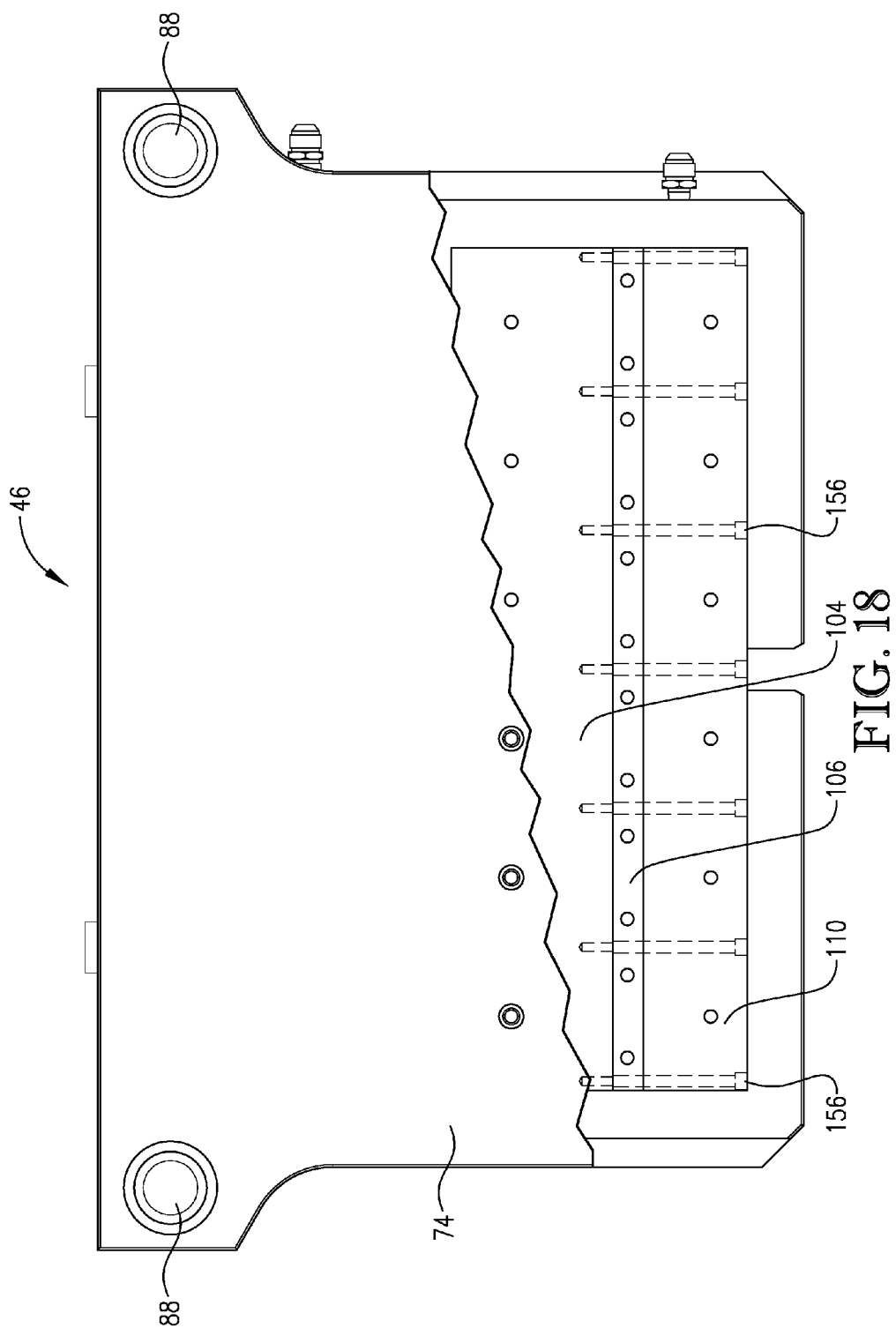
FIG. 18 is a cutaway top view of the injection station depicted in FIG. 16, particularly illustrating the spacing of the mechanical fasteners extending horizontally through the interlock insert halves, neck mold halves, and body mold halves.
Figure 19:
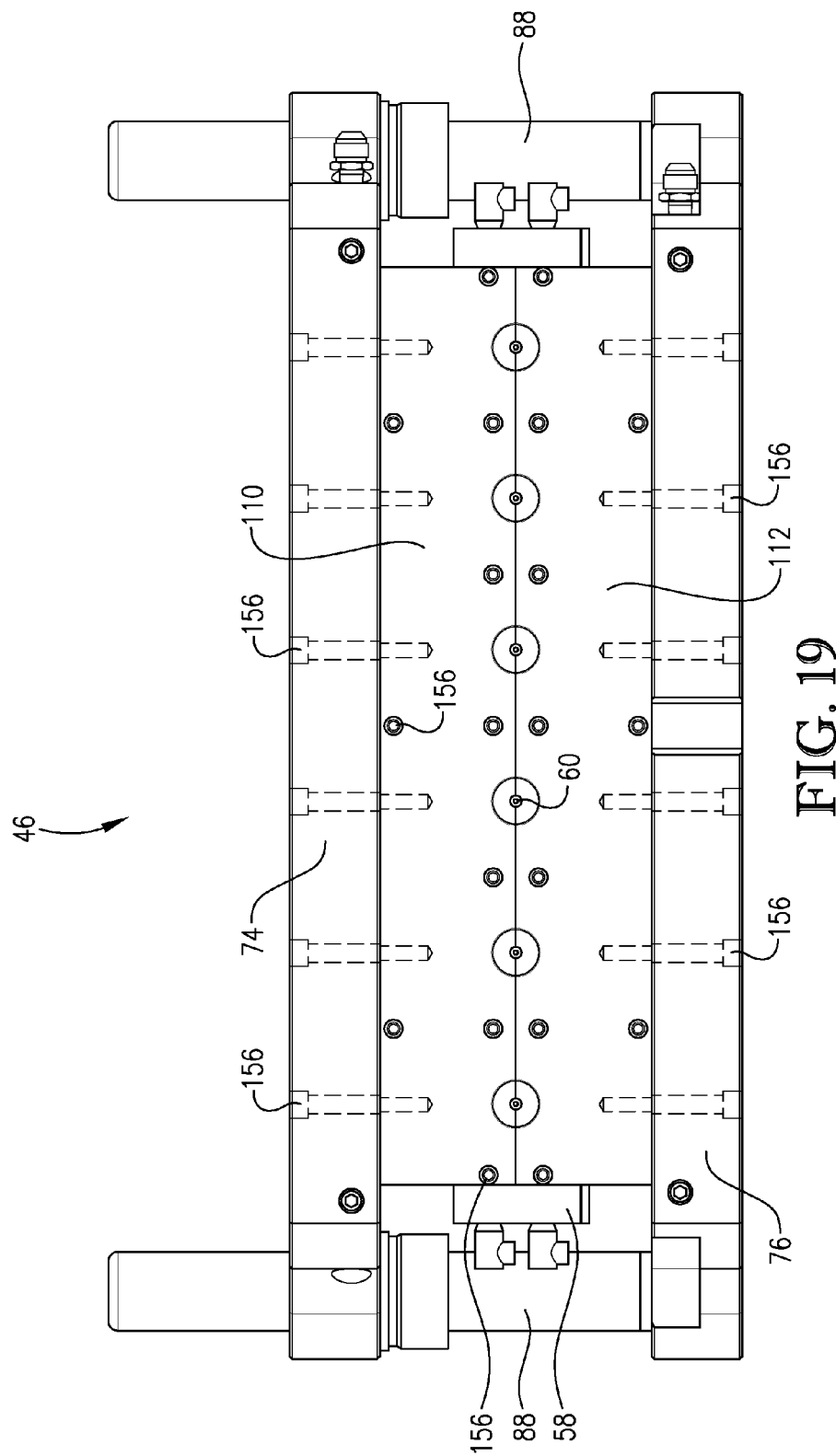
FIG. 19 is a front view of the injection station depicted in FIG. 16, particularly illustrating the spacing of the mechanical fasteners extending vertically through the first or second die set and portions of the split parison mold assembly.
Figure 20:
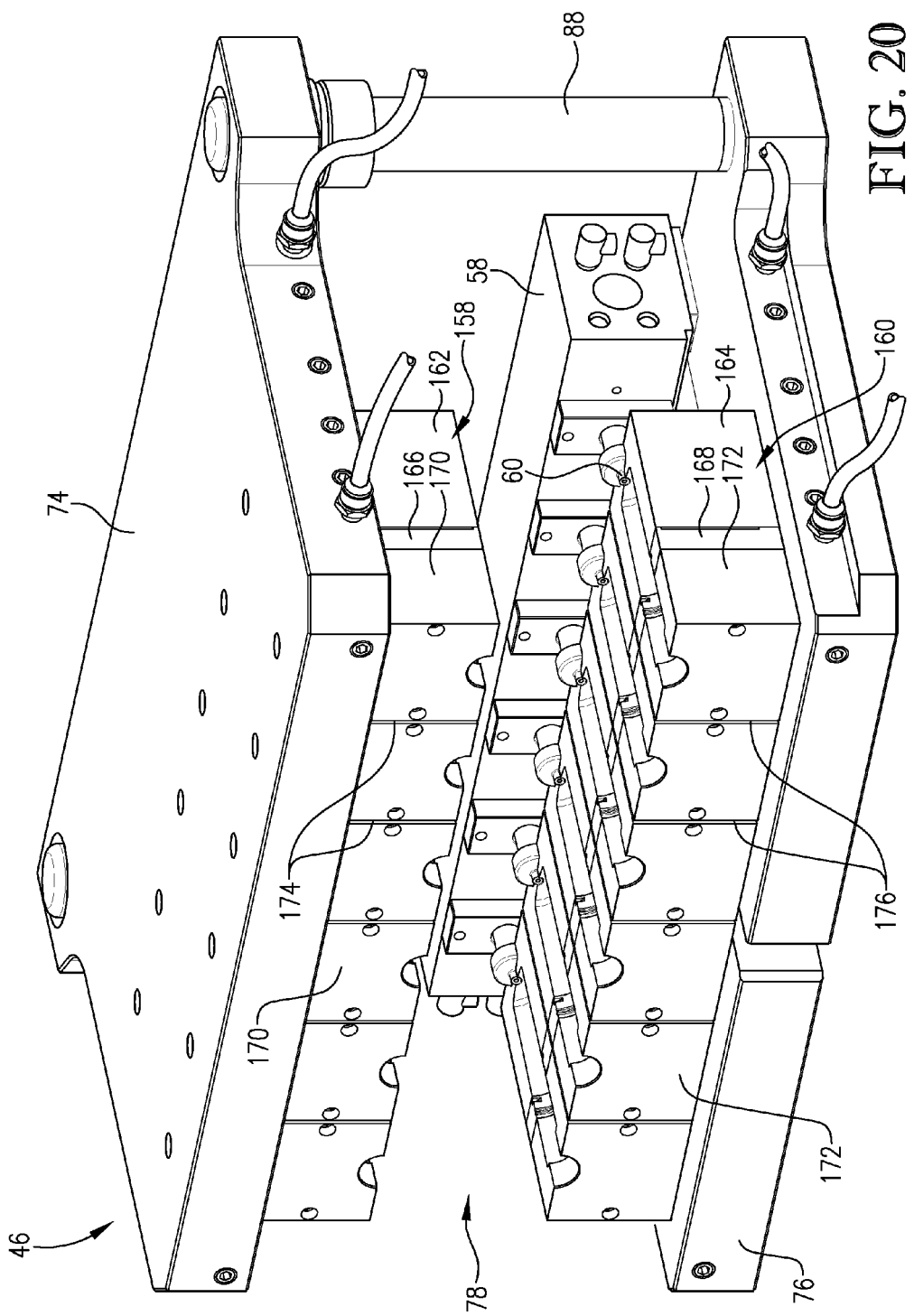
FIG. 20 is an isometric view of an injection station configured in accordance with a second embodiment of the present invention, particularly illustrating the injection station in an open position with two die sets attached to a plurality of first or second individual mold halves, each individual mold half comprising an individual neck mold half and an individual body mold half forming one of the parison cavities.
Figure 21:
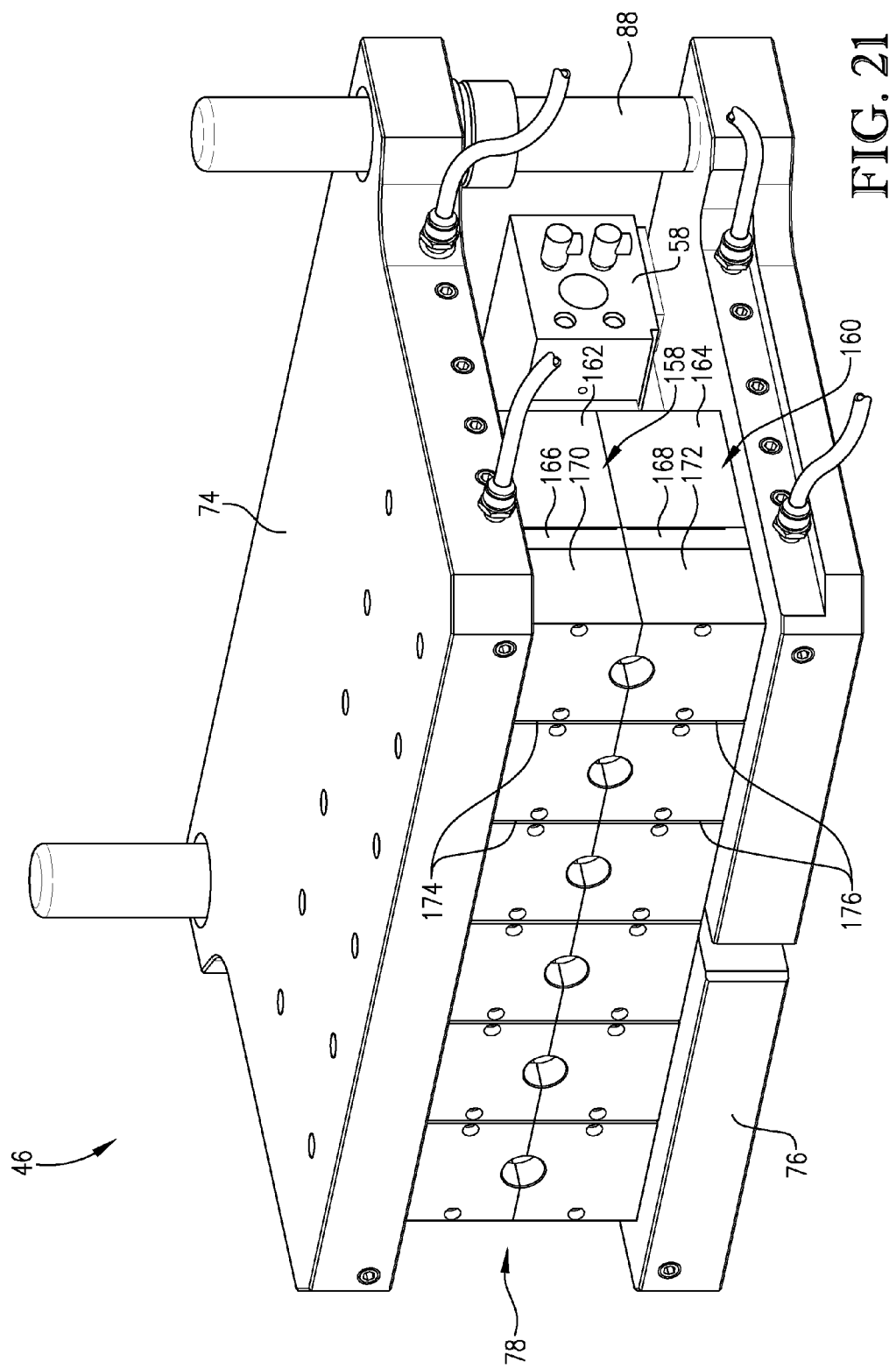
FIG. 21 is an isometric view of the injection station of FIG. 20 in a closed position.
Figure 22:
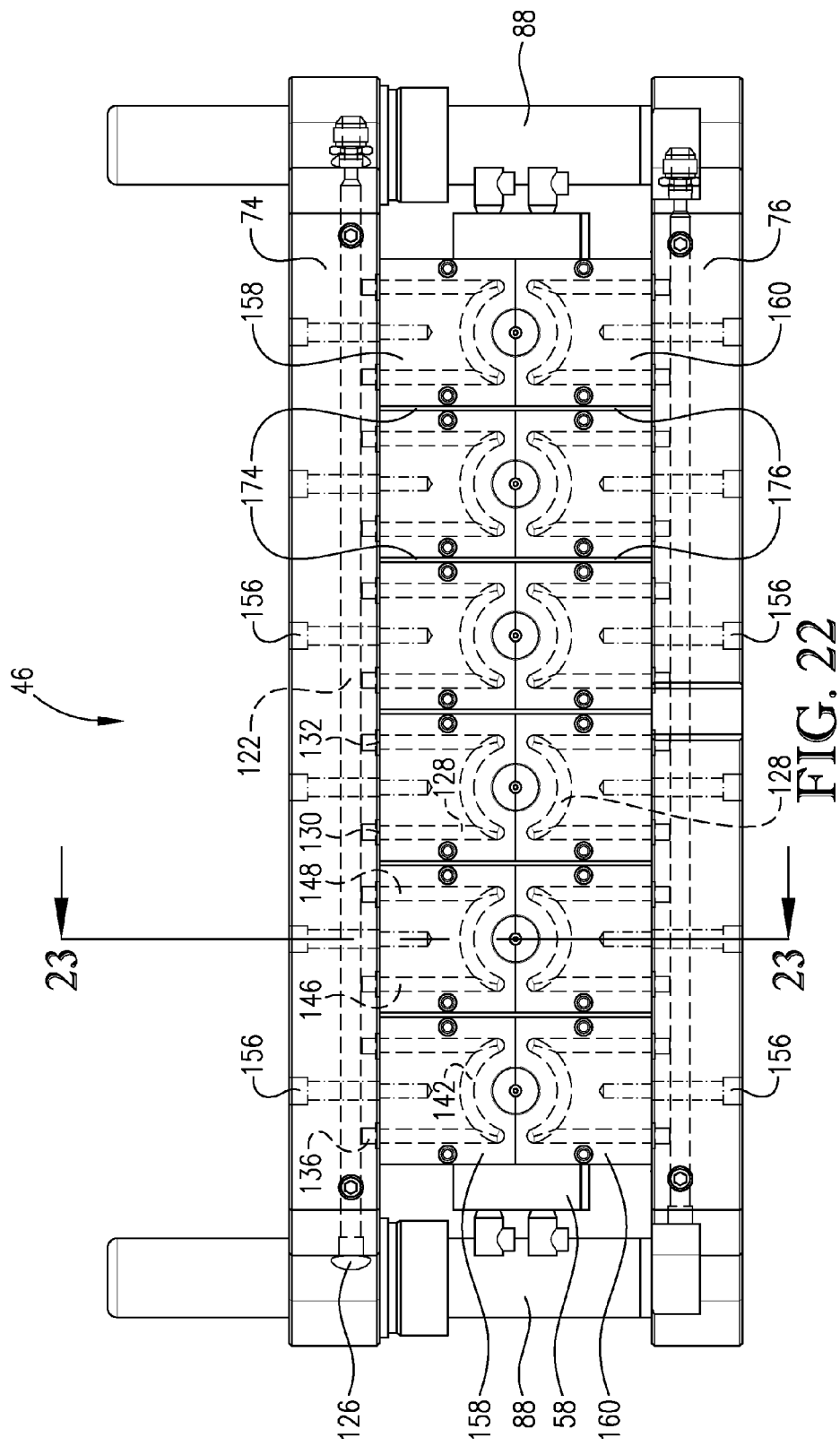
FIG. 22 is a front view of the injection station of FIG. 21, particularly illustrating mechanical fasteners independently attaching each of the individual mold halves to the first or second die set.
Figure 23:
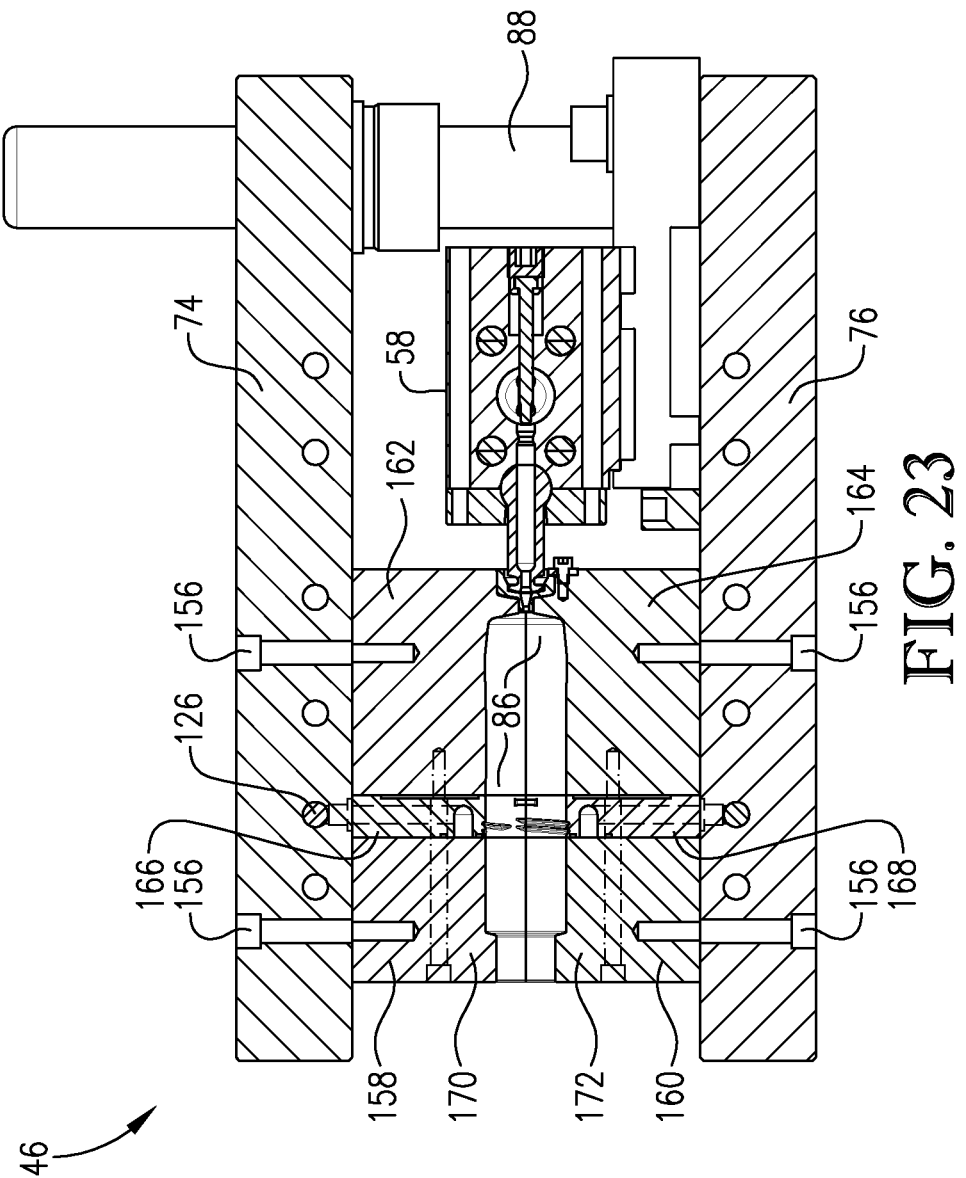
FIG. 23 is a cross-sectional side view of the injection station of FIG. 21, particularly illustrating individual body mold halves and individual interlock inserts independently attached to the first or second die set.

As illustrated in FIGS. 14 and 15, the curvature of each of the contoured heat transfer channels 142 may be substantially concentric with the curvature of the neck of the parison with which it is associated and the neck-forming surface 98,100 with which it is associated. The inner face 144 of the contoured heat transfer channel 142 may have an arcuate shape. The inner face 144 of the contoured heat transfer channel 142 may also be spaced from the neck-forming surface 98,100 with which it is associated by a distance S (as illustrated in FIG. 15), which may be at least 0.05, 0.1, or 0.15 inches and/or not more than 2, 1, or 0.5 inches. The inner face 144 of the contoured heat transfer channel 142 may have a radius of curvature $r_1$ that is at least 0.25, 0.5, 0.75, or 1 inch and/or not more than 5, 3, or 2. Furthermore, the inner face 144 of the contoured heat transfer channel 142 may extend through an angle θ (as illustrated in FIG. 15) that is at least 90, 120, or 140 degrees and/or not more than 175 or 180 degrees. The radius of the neck-forming surface 98,100 is denoted by $r_2$ in FIG. 15. The length of each of the contoured channels 142 may be at least 1, 1.25, or 1.5 inches and/or not more than 10, 8, or 5 inches.

At least one of the contoured channels 142 may be located between and fluidly connected to a supply channel 146 and a return channel 148, with the supply channel 146 extending to the inlet end 130 and the return channel 148 extending to the outlet end 132 of the mold half channels 128. The supply and return channels 146,148 may extend from the contoured heat transfer channel 142 in a direction that is generally away from the neck-forming surface 98,100 with which the contoured heat transfer channel 142 is associated. The supply and return channels 146,148 may be substantially linear and/or parallel with each other and connected to generally opposite ends of the contoured heat transfer channel 142. The supply and return channels 146,148 may also be substantially perpendicular relative to the linear channels 122 in the die sets 74,76.

In some embodiments of the injection station 46, the first and second interlock inserts 110,112 may be disposed adjacent the first and second neck mold halves 106,108 respectively, such that at least a portion of the contoured channels 142 are cooperatively defined by the interlock inserts 110,112 and the neck mold halves 106,108, as illustrated in FIGS. 13-14. For example, the contoured channels 142 may be milled into a front face of the neck mold halves 106,108, and then the first and second interlock inserts 110,112 may be attached to the front face of the first and second neck mold halves 106,108 respectively, thereby cooperatively forming the contoured channels 142.

An interlock seal 150 may be placed around a periphery of each of the contoured channels 142 at the front face of the neck mold halves 106,108, such that the interlock seal 150 is disposed between the neck mold halves 106,108 and their corresponding interlock inserts 110,112. The interlock seal 150 may be a gasket, sealant, or any other sealing device configured to prevent heat transfer fluid from leaking between the front face of the neck mold halves 106,108 and the interlock inserts 110,112.

Figure 9:
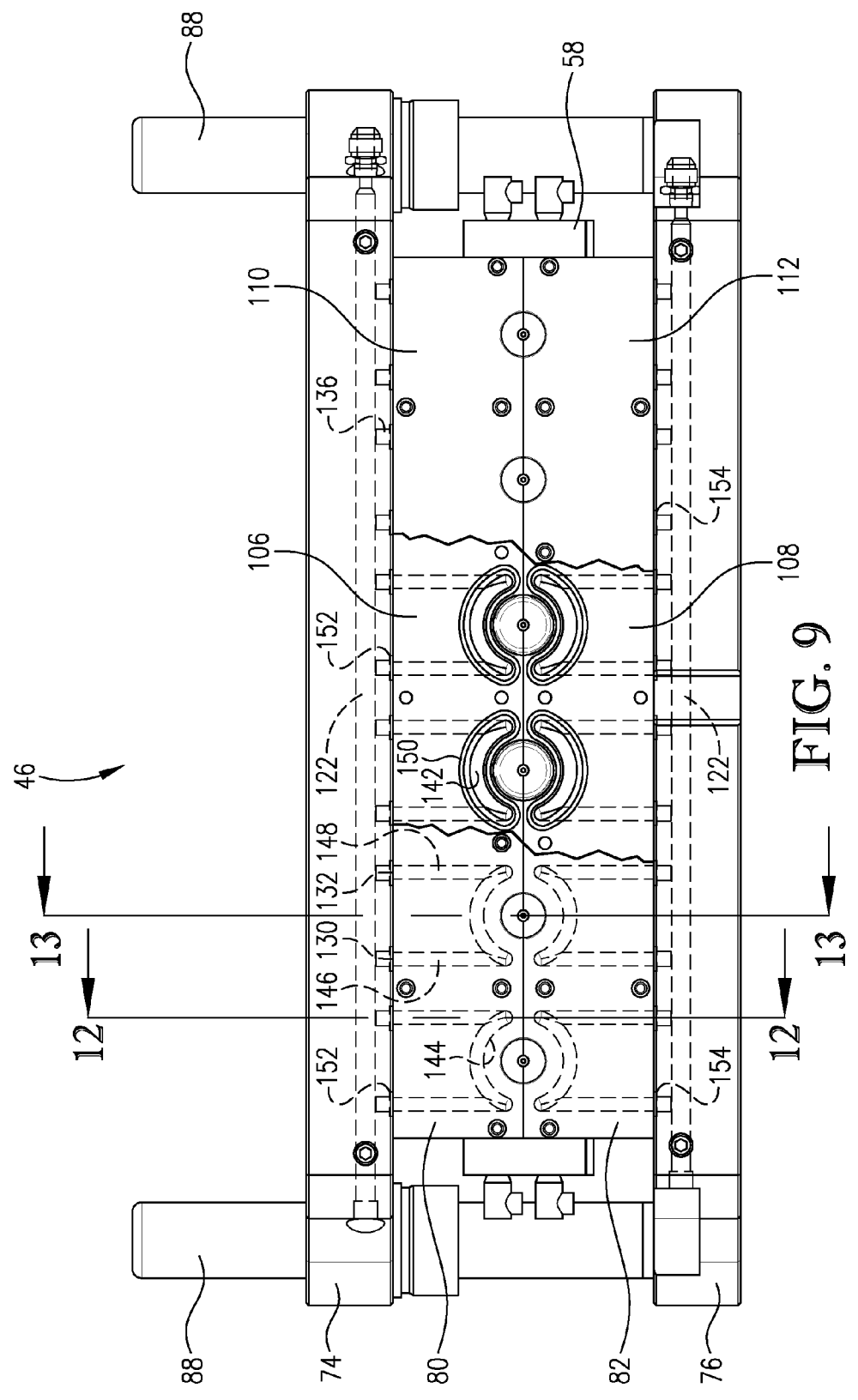

As shown in FIG. 9, the injection station 46 may further comprise a plurality of first and second sealing members 152,154. The first and second sealing members may be gaskets, sealant, or any other sealing device configured to prevent heat transfer fluid from leaking between the inlet ends 130 and outlet ends 132 of the mold half channels 128 and the extension channels 136 fluidly connecting the linear channels 122 with the mold half channels 128. Each of the first sealing members 152 may be disposed between the first die set 74 and the first parison mold half 80 proximate a location where one of the heat transfer channels 84 of the first die set 74 connects in fluid-flow communication with one of the heat transfer channels 84 in the first parison mold half 80. Each of the second sealing members 154 may be disposed between the second die set 76 and the second parison mold half 82 proximate a location where one of the heat transfer channels 84 in the second die set 76 connects in fluid-flow communication with one of the heat transfer channels 84 defined in the second parison mold half 82.

Each component of the split parison mold assembly 78 may be directly attached to its corresponding die set 74,76. In some embodiments of the injection station 46, various components may be independently attached to the die sets 74,76. Specifically, the first and second body mold halves 102,104, first and second neck mold halves 106,108, and first and second interlock insert halves 110,112 may each be directly and independently coupled to the first or second die sets 74,76, respectively. Therefore, the body mold halves 102, 104, neck mold halves 106,108, and interlock insert halves 110,112 may each be independently disconnected from the die sets 74,76 without removing any of the other components.

As illustrated in FIGS. 16-19, a plurality of male threaded members may couple the first and second interlock inserts, neck mold halves, and body mold halves to one another and/or to the first and second die sets, respectively. For example, the first and second monolithic neck mold halves may be directly coupled to the first and second die sets respectively, and the first and second body mold halves may be directly coupled to the first and second die sets respectively. The coupling of these components may be accomplished using a plurality of mechanical fasteners 156.

For example, in the embodiments illustrated in FIGS. 16-19, the mechanical fasteners 156 comprise a plurality of vertically-extending male threaded members extending through the first and second die sets 74,76 and into either one of the interlock insert halves 110,112 or one of the body mold halves 102,104. In FIGS. 16-19, the mechanical fasteners 156 also include a plurality of horizontally-extending male threaded members extending through the first or second interlock insert halves 110,112, then through the first or second neck mold halves 106,108, respectively, and into the first or second body mold halves 102,104 respectively.

FIGS. 4-19 illustrate an injection station 46 with the first and a second parison mold halves 80,82, each comprising one monolithic body mold half, one monolithic neck mold half, and one monolithic interlocking insert half. However, in alternative embodiments illustrated in FIGS. 20-23, a plurality of first individual mold halves 158 and a plurality of second individual mold halves 160 are each independently attached to their respective die sets 74,76 in a spaced-apart configuration. As used herein, the term "independently coupled" denotes connection of a first component to a second component in a manner such that disconnection and removal of the first component from the second component does not require disconnection of any fasteners other than the fasteners that contact and connect both the first or second components.

In this configuration, each of the first individual mold halves 158 has a corresponding one of the second individual mold halves 160 with which it cooperates to define a single one of the parison cavities 86. In certain embodiments, each of the first individual mold halves 158 are horizontally-spaced from one another to thereby form first gaps 174 therebetween, and each of the second individual mold halves 160 are horizontally-spaced from one another to thereby form second gaps 176 therebetween.

Advantageously, no horizontally-extending fasteners are used or required to couple the first individual mold halves 158 to one another or to couple the second individual mold halves 160 to one another, since they are each independently attached to their respective die sets 74,76. Specifically, each of the first individual mold halves 158 may be coupled to the first die set 74 by one or more vertically-extending mounting fasteners 156, and each of the second individual mold halves 160 may be coupled to the second die set 76 by one or more vertically-extending mounting fasteners 156. The vertically-extending mounting fasteners may each include a male threaded portion. In this embodiment of the injection station 46, vertically-extending mounting fasteners may be the only means used to couple the first and second individual mold halves 158,160 to the first and second die sets 74,76, respectively.

The plurality of first and second mold halves 158,160 may each comprise a first and second individual body mold half 162,164, a first and second individual neck mold half 166, 168, and a first and second individual interlocking insert half 170,172 respectively. Specifically, the first and second body mold halves 102,104 may each comprise a plurality of first and second individual body mold halves 162,164, each directly and independently coupled to the first or second die set 74,76 respectively and each configured to define at least a portion of the exterior shape of the body of only one of the parisons. Furthermore, the first and second neck mold halves 106,108 may each comprise a plurality of first and second individual neck mold halves 166,168, each directly and independently coupled to the first or second die set 74,76 respectively and each configured to define at least a portion of the exterior shape of the neck of only one of the parisons. Also, the first and second interlocking insert halves 110,112 may each comprise a plurality of first and second individual interlocking insert halves 170,172 each directly and independently coupled to the first or second die set 74,76 respectively. The individual body mold halves 162,164 may each be spaced apart from one another, the individual neck mold halves 166, 168 may each be spaced apart from one another, and/or the individual interlocking insert halves 170,172 may each be spaced apart from one another.

Each of the first individual body mold halves 162 may have a corresponding second individual body mold half 164, and each of the first individual neck mold halves 166 may have a corresponding second neck mold half 168. Each pair of corresponding first and second individual body mold halves 162, 164 may cooperatively defines the exterior shape of the body of one of the parisons, and each pair of corresponding first and second individual neck mold halves 166,168 may cooperatively define the exterior shape of the neck of one of the parisons. In some embodiments, the split parison mold of the injection station 46 may comprise at least two, four, or six of the first individual body mold halves 162,164 and at least two, four, or six of the second individual body mold halves 166, 168.

The individual first and second neck mold halves 166,168 may each have one of the mold half channels 128 formed therein and in fluid-flow communication with the heat transfer channels 84 in the first or second die set 74,76. For example, heat transfer fluid may flow from a first mold half channel in one individual first neck mold half to a second mold half channel in an adjacent individual first neck mold half via a connecting portion of one of the linear channels 122 or via one of the connecting heat transfer channels 134 in the first die set 74.

The injection molding process performed with the injection station 46 embodiment illustrated in FIGS. 20-23 is identical to the process performed with embodiments having primarily monolithic components, as in FIGS. 4-19. For example, the injection molding process may comprise moving the split parison mold assembly 78 from the open to the closed position, with the core rods 54 disposed within the parison cavities 86, then injecting resin into the plurality of parison cavities 86. Simultaneously, the heat transfer fluid may be passed through the heat transfer channels 84 throughout the injection station 46.

In some alternative embodiments of the injection station 46, at least some components of the first and second parison mold halves 80,82 may be monolithic while other components are comprised of a plurality of individual components. For example, the first and second body mold halves 102,104 may each be monolithic components while the first and second neck mold halves 106,108 may comprise a plurality of first individual neck mold halves 166 and a plurality of second individual neck mold halves 168.

In split parison mold configurations described above where at least some of the components of the split parison mold assembly 78 are independently coupled with the die sets 74,76 and are not directly coupled with each other, the IBM machine 42 may be reconfigured to produce different shapes and sizes of parisons and/or molded articles. For example, in an injection blow molding process, a first group of parisons may be injection molded at the injection station 46 using a first split parison mold assembly to define the exterior shape of the first group of parisons. The first group of parisons may then be blow molded into a first group of molded articles at the blowing station 48. Next, at least one component of the first split parison mold assembly may be replaced with another component, thus creating a second split parison mold assembly attached to the die sets. Then a second group of parisons may be injection molded at the injection station 46 using the second split parison mold assembly to define the exterior shape of the second group of parisons. The second group of parisons may then be blow molded into a second group of molded articles at the blowing station 48. The first and second groups of parisons may have different exterior shapes.

In some embodiments, the same blowing station 48 may be used to blow mold both the first and second groups of parisons into the first and second groups of molded articles respectively. Alternatively, the step of blow molding the first group of parisons may utilize a first blow mold assembly, such as a first upper mold half and a first lower mold half, to define the external shape of the first group of molded articles. Then the injection blow molding process may further comprise replacing the first blow mold assembly or the first upper and lower mold halves, with a second blow mold assembly, such as a second upper mold half and a second lower mold half. The second blow mold assembly may have a substantially different configuration than the first blow mold assembly. The step of blow molding the second group of parisons may thus utilize the second blow mold assembly, or second upper and lower mold halves, to define the external shape of the second group of molded articles. The first and second groups of molded articles have substantially different configurations.

As described above, the injection molding of the first and second groups of parisons may include passing heat transfer fluid through the heat transfer channels 84 defined within the injection station 46. The temperature of the heat transfer fluid introduced into the injection station 46 may be substantially the same during the injection molding of the first group of parisons and the second group of parisons.

This method of exchanging components of the split parison mold assembly 78 may be particularly useful in an initial design of the split parison mold and/or the blowing station 48.

For example, if the first group of molded articles exhibits at least one undesirable characteristic, the second parison mold assembly may be configured to eliminate the undesirable characteristic in the second group of molded articles. Then the second parson mold assembly may replace the first parison mold assembly on the die sets 74,76. The undesirable characteristic may include excessive wall thickness, inadequate wall thickness, and/or non-uniform wall thickness.

The exchangeable first and second parison mold assemblies may present respective first and second parison neck-forming surfaces for defining the external shape of the necks of the parisons in the first and second groups of parisons respectively. Furthermore, the first and second parison mold assemblies may present respective first and second parison body-forming surfaces for defining the external shape of the bodies of the parisons in the first and second groups of parisons respectively.

During the injection molding of each of the first and second groups of parisons, the surface temperature of at least 70 percent of the total surface area of the first and second parison body-forming surfaces is maintained at a temperature within 20° F. of the target body surface temperature. For example, the target body surface temperature may be 210° F., or may be in any of the ranges disclosed herein for the target body surface temperature. In one embodiment, during the injection molding of each of the first and second groups of parisons, the surface temperature of at least 90 percent of the total surface area of the first and second parison body-forming surfaces may be maintained in the range of 205 to 215° F. Furthermore, during the injection molding of each of the first and second groups of parisons, the temperature of at least 90 percent of the total surface area of the parison neck-forming surfaces may be maintained between 75 and 150° F.

Although the invention has been described with reference to the preferred embodiment illustrated in the attached drawing figures, it is noted that equivalents may be employed and substitutions made herein without departing from the scope of the invention as recited in the claims.

What is claimed is:

1. An injection blow molding process comprising:
 (a) injection molding a polyolefin resin at an injection station to form a plurality of parisons, wherein said injection station comprises a split parison mold assembly shiftable between an open position and a closed position, wherein said split parison mold assembly presents first and second parison cavity surfaces that, when said split parison mold assembly is in said closed position, cooperatively define a plurality of parison cavities within which said resin is received;
 (b) simultaneously with step (a), passing a heat transfer fluid through a plurality of heat transfer channels defined within said injection station so as to regulate the temperature of at least a portion of said parison cavity surfaces, wherein each of said parison cavity surfaces comprises a neck-forming surface for defining the exterior shape of the necks of said parisons and a body-forming surface for defining the exterior shape of the bodies of said parisons, wherein during said injection molding the surface temperature of at least 70 percent of the total surface area of said body-forming surfaces is maintained within 20° F. of a target body surface temperature;
 (c) transferring said parisons from said injection station to a blowing station; and
 (d) blow molding said parisons at said blowing station to form a plurality of molded articles,
 wherein said passing of step (b) includes passing at least a portion of said heat transfer fluid through heat transfer channels defined within first and second die sets of said injection station,
 wherein said split parison mold assembly is coupled to said first and second die sets.

2. The process of claim 1, wherein said target body surface temperature is in the range of 190 to 230° F.

3. The process of claim 1, wherein said target body surface temperature is 210° F.

4. The process of claim 3, wherein during said injection molding of step (a) the temperature of at least 80 percent of the total surface area of said body-forming surfaces is maintained within 10° F. of said target body surface temperature.

5. The process of claim 1, wherein during said injection molding of step (a) the temperature of at least 90 percent of the total surface area of said body-forming surfaces is maintained within 5° F. of said target body surface temperature, wherein said target body surface temperature is in the range of 205 to 215° F.

6. The process of claim 1, wherein during said injection molding of step (a) the temperature of at least 70 percent of the total surface area of said neck-forming surfaces is maintained within 20° F. of a target neck surface temperature, wherein said target neck surface temperature is at least 10° F. less than said target body surface temperature.

7. The process of claim 6, wherein said target body surface temperature is 210° F., wherein said target neck surface temperature is at least 25° F. less than said target body surface temperature.

8. The process of claim 1, wherein during said injection molding of step (a) the temperature of at least 90 percent of the total surface area of said body-forming surfaces is maintained between 205 and 215° F. and the temperature of at least 90 percent of the total surface area of said neck-forming surfaces is maintained between 75 and 150° F.

9. The process of claim 1, wherein said split parison mold assembly comprises first and second body mold halves coupled to said first and second die sets respectively, wherein said first and second body mold halves present said body-forming surfaces, wherein said first and second body mold halves optionally define one or more heat transfer channels, wherein the ratio of the total volume of said heat transfer channels defined within said die sets to the total volume of heat transfer channels defined in said body mold halves is at least 1:1.

10. The process of claim 1, further comprising routing said heat transfer fluid from a single temperature control unit to said injection station, wherein all of said heat transfer fluid supplied to said injection station first passes through said single temperature control unit and enters said injection station at substantially the same temperature.

11. The process of claim 1, further comprising repeating steps (a) through (d) at least 100 times sequentially.

12. An injection blow molding process comprising:
 (a) injection molding a polyolefin resin into a plurality of parisons at an injection station, wherein said injection molding comprises—
  (i) introducing said polyolefin resin into a plurality of parison cavities defined within said injection station,
  (ii) introducing a heat transfer fluid into a plurality of heat transfer channels defined within said injection station, wherein at least 75 volume percent of said heat transfer fluid introduced into all of said heat transfer channels is introduced at an inlet temperature that is within 20° F. of a common target inlet temperature for all of said heat transfer channels;

(b) transferring said parisons from said injection station to a blowing station; and (c) blow molding said parisons into molded articles at said blowing station, wherein said injection station comprises first and second die sets shiftable between an open position and a closed position, wherein said injection station further comprises a split parison mold assembly coupled to said first and second dies sets and operable to define said parison cavities when said dies sets are in said closed position, wherein at least a portion of said heat transfer channels are defined within said first and second die sets, wherein the ratio of the total volume of said heat transfer channels defined in said dies sets to the total volume of said heat transfer channels defined within said split parison mold assembly is at least 1:1.

13. The process of claim 12, wherein said target inlet temperature is in the range of 40 to 150° F.

14. The process of claim 13, wherein at least 90 volume percent of said heat transfer fluid introduced into said heat transfer channels is introduced at an inlet temperature that is within 10° F. of said target inlet temperature.

15. The process of claim 14, wherein said target inlet temperature is in the range of 50 to 100° F.

16. The process of claim 12, wherein all of said heat transfer fluid introduced into said heat transfer channels is introduced at the same temperature.

17. The process of claim 12, further comprising controlling the temperature of said heat transfer fluid in a single temperature control unit prior to introducing said heat transfer fluid into said heat transfer channels.

18. An injection blow molding process comprising:

(a) injection molding a resin into a first group of parisons at an injection station utilizing a first split parison mold assembly to define the exterior shape of said first group of parisons;

(b) blow molding said first group of parisons into a first group of molded articles at a molding station;

(c) replacing at least one component of said first split parison mold assembly to thereby provide a second split parison mold assembly;

(d) injection molding said resin into a second group of parisons at said injection station utilizing said second parison mold assembly to define the exterior shape of said second group of parisons; and (e) blow molding said second group of parisons into a second group of blow molded articles at said blow molding station, wherein said first and second groups of parisons have different exterior shapes, wherein said injection molding of steps (a) and (d) includes passing a heat transfer fluid through a plurality of heat transfer channels defined within said injection station, wherein the temperature of said heat transfer fluid introduced into said injection station is substantially the same during said injection molding of steps (a) and (d), wherein said injection station comprises upper and lower die sets shiftable between an open position and a closed position, wherein said first and second split parison mold assemblies are coupled to said die sets, wherein at least 20 percent of the total volume of said heat transfer channels associated with said injection station of steps (a) and (d) is defined within said die sets.

19. The process of claim 18, wherein said first group of molded articles exhibits at least one undesirable characteristic, wherein said second parison mold assembly is configured to eliminate said undesirable characteristic in said second group of molded articles, wherein said blow molding of steps (b) and (e) utilizes the same blow mold assembly to define the external shape of said first and second groups of molded articles.

20. The process of claim 19, wherein said undesirable characteristic includes excessive wall thickness, inadequate wall thickness, and/or non-uniform wall thickness.

21. The process of claim 18, wherein said blow molding of step (b) utilizes a first blow mold assembly to define the external shape of said first group of molded articles, wherein said injection blow molding process further comprises replacing said first blow mold assembly with a second blow mold assembly having a substantially different configuration than said first blow mold assembly, wherein said blow molding of step (e) utilizes said second blow mold assembly to define the external shape of said second group of molded articles, wherein said first and second groups of molded articles have substantially different configurations.

22. The process of claim 18, wherein said first and second parison mold assemblies present respective first and second parison neck-forming surfaces for defining the external shape of the necks of the parisons in said first and second groups of parisons respectively, wherein said first and second parison mold assemblies present respective first and second parison body-forming surfaces for defining the external shape of the bodies of the parisons in said first and second groups of parisons respectively, wherein during said injection molding of steps (a) and (d) the surface temperature of at least 70 percent of the total surface area of said first and second parison body-forming surfaces is maintained at a temperature within 20° F. of a target body surface temperature.

23. The process of claim 22, wherein said target body surface temperature is 210° F.

24. The process of claim 22, wherein during said injection molding of steps (a) and (d) the surface temperature of at least 90 percent of the total surface area of said first and second parison body-forming surfaces is maintained in the range of 205 to 215° F.

25. The process of claim 24, wherein during said injection molding of steps (a) and (d) the temperature of at least 90 percent of the total surface area of said parison neck-forming surfaces is maintained between 75 and 150° F.

26. The process of claim 18, wherein at least 50 percent of the total volume of said heat transfer channels associated with said injection station of steps (a) and (d) is defined within said die sets.

* * * * *